United States Patent
Cattaneo

(10) Patent No.: US 11,333,184 B2
(45) Date of Patent: May 17, 2022

(54) JOINING SYSTEM WITH FRONT ACTUATION AXIS FOR FURNITURE

(71) Applicant: Leonardo S.r.l., Figino Serenza (IT)

(72) Inventor: Carlo Cattaneo, Figino Serenza (IT)

( * ) Notice: Subject to any disclaimer, the term of this patent is extended or adjusted under 35 U.S.C. 154(b) by 598 days.

(21) Appl. No.: 16/307,162

(22) PCT Filed: Jun. 30, 2017

(86) PCT No.: PCT/EP2017/066275
§ 371 (c)(1),
(2) Date: Dec. 5, 2018

(87) PCT Pub. No.: WO2018/007252
PCT Pub. Date: Jan. 11, 2018

(65) Prior Publication Data
US 2019/0145449 A1    May 16, 2019

(30) Foreign Application Priority Data

Jul. 7, 2016    (IT) .................. 102016000070803

(51) Int. Cl.
*F16B 12/20* (2006.01)
*A47B 95/00* (2006.01)

(52) U.S. Cl.
CPC .......... *F16B 12/2063* (2013.01); *A47B 95/00* (2013.01); *A47B 2230/07* (2013.01)

(58) Field of Classification Search
CPC ...... F16B 12/2063; F16B 12/54; F16B 12/18; A47B 95/00; A47B 2230/07
See application file for complete search history.

(56) References Cited

U.S. PATENT DOCUMENTS

| | | | | |
|---|---|---|---|---|
| 4,991,805 A * | 2/1991 | Solak | ....................... | F16M 7/00 248/188.4 |
| 5,292,095 A * | 3/1994 | Cattaneo | ............... | A47B 91/028 248/188.4 |
| 5,500,963 A * | 3/1996 | Yeh | ....................... | A47C 19/005 403/231 |
| 6,279,860 B1 * | 8/2001 | Swanger | ................... | B66F 3/16 248/125.2 |
| 6,910,665 B2 * | 6/2005 | Avendano | ............... | E05D 11/00 16/284 |

(Continued)

FOREIGN PATENT DOCUMENTS

| | | | | |
|---|---|---|---|---|
| EP | 2808565 | 12/2014 | | |
| WO | WO-2005115199 A1 * | 12/2005 | ........... | A47B 91/028 |
| WO | 2017046087 | 3/2017 | | |

*Primary Examiner* — Ko H Chan
(74) *Attorney, Agent, or Firm* — Themis Law

(57) ABSTRACT

A joining system for use in furniture and furnishing items with a bottom and a shoulder has a front actuation axis under the bottom and includes a front joining unit and a rear joining unit positioned between the bottom and the shoulder of the furniture or furnishing item. A connection group is inserted in each front and rear joining unit and is aligned with a symmetry axis of the bottom, and a blocking group of the front and rear joining units is attached beneath the thickness of the bottom. The front joining unit provides an actuation and supporting member toward the rear joining unit, and the blocking group provides a grub screw inserted in a casing and caused to slide by way of a conical rack and pinion system, to be received in a bevel in the pin.

12 Claims, 26 Drawing Sheets

(56) References Cited

U.S. PATENT DOCUMENTS

| | | | |
|---|---|---|---|
| 7,556,227 B2 * | 7/2009 | Thuelig | D06F 39/125 248/188.8 |
| 8,528,188 B2 * | 9/2013 | Vestergaard-Jensen | F16B 12/18 29/525.01 |
| 10,765,209 B2 * | 9/2020 | De Brun | A47B 91/02 |
| 2010/0322740 A1 | 12/2010 | Vestergaard-Jensen | |

* cited by examiner

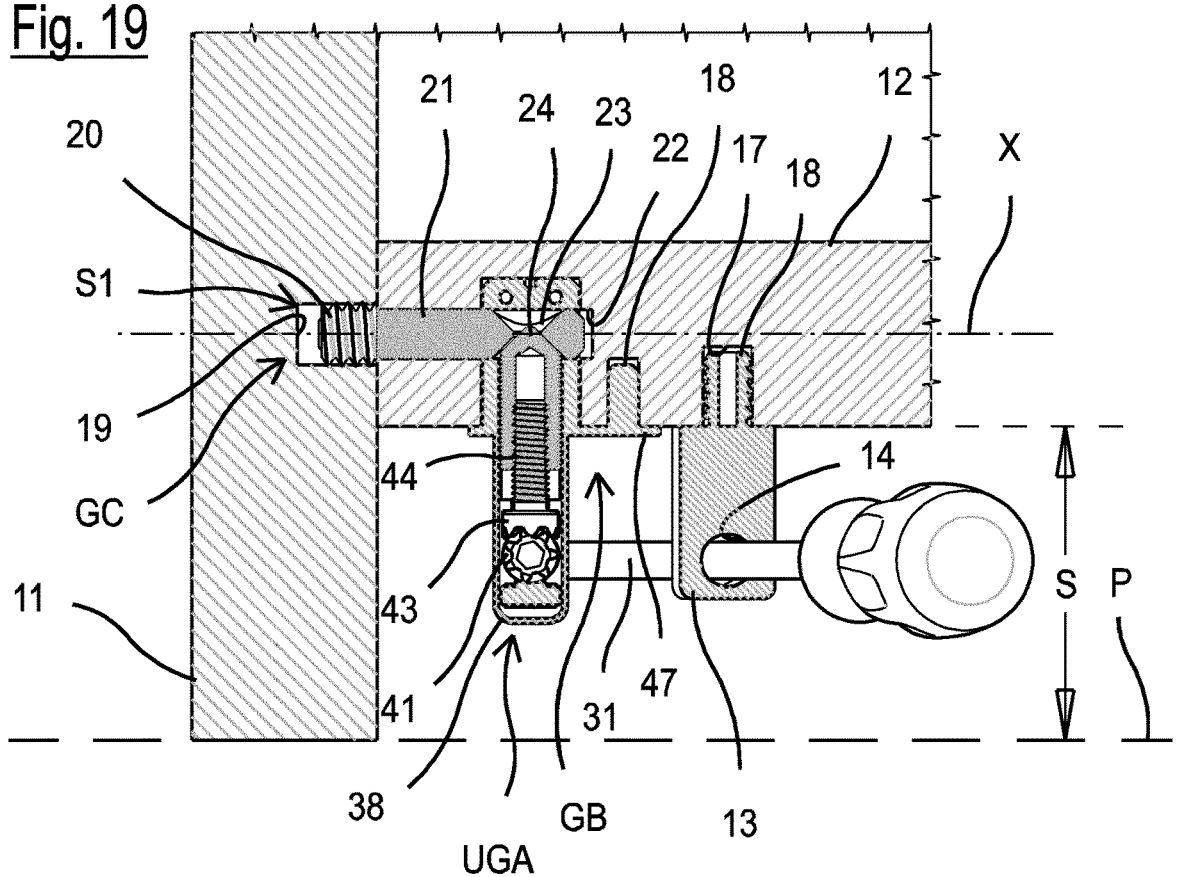
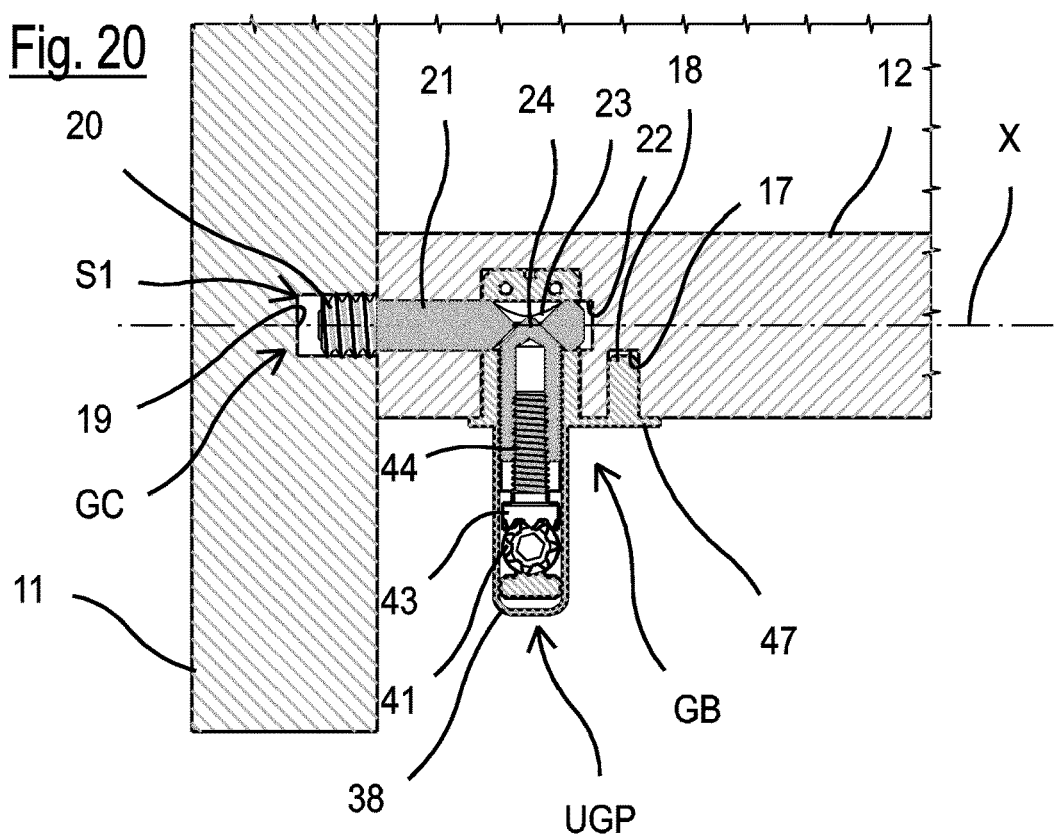

JOINING SYSTEM WITH FRONT ACTUATION AXIS FOR FURNITURE

The present invention relates to a joining system with front actuation in axis with a bottom of furniture and furnishing items.

Various types of joints are known, such as that object of European patent application EP 930436 A1 which provides a cam element for actuating expandable gripping means or in any case, a mechanism for actuating the joint, which require holings in the panels, having a certain complexity.

Other systems are also known for joining a bottom or base of a piece of furniture and a shoulder of a piece of furniture in the furnishing industry in general; the joining is currently effected by positioning a plug screwed into a hole of the shoulder and, for example, a butt or similar constraining element inserted in a hole formed in the bottom or base of the furniture.

In order to produce this type of joint, a relatively large hole must be made in the bottom or base of the furniture, which receives the butt or similar constraining element which, in turn, houses a grub screw in a threaded portion of the same.

If visible, this hole is not very acceptable for the user.

Attempts have been made to overcome this drawback by covering the hole thus produced with a suitable cap to try and restore the aesthetical appearance of the parts involved in the joining. Visible holes in fact do not allow a satisfactory appearance and must be covered by caps.

Furthermore, the presence of caps causes hindrances and obstacles for the positioning of objects on the bottom or base of the furniture, in any case creating disturbance for the user.

It should also be taken into account that an actuation from above, in particular for lower joints, is not always easy, in the presence of limited spaces between shelves or minimum distances from the bottom of the furniture or rear wall of the furniture, and, as already indicated, visible holes are required which are greatly criticized by users.

EP 2808565A1 relates to a joining system according to the preamble of claim 1.

The general objective of the present invention is therefore to provide a joining system with front actuation in axis with a bottom of furniture and furnishing items capable of solving the drawbacks of the known art mentioned above, in a simple, economical and functional manner.

A further objective of the present invention is to provide a joining system which, in addition to having a minimum visibility on the part of an observer, and therefore a high aesthetical value, can be easily accessible, even from a free area between the bottom and floor where the furniture is positioned.

Another objective of the present invention is to provide a joining system between end portions of vertical walls and the bottom of a piece of furniture or furnishing item, which does not create a significant encumbrance between the bottom or base and the floor.

The above objectives are achieved by a joining system produced according to the independent claim 1 and following subclaims.

The structural and functional characteristics of the present invention and its advantages with respect to the known art will appear even more evident from the following description, referring to the enclosed schematic drawings, which show embodiment examples of the invention itself, all having the same innovative concept. In the drawings:

FIGS. 1 and 2 are two perspective views of a first embodiment, one partially sectional and the other enlarged with respect to the first view with a different section line, of a joining system with front actuation in axis with the thickness of a bottom of furniture and furnishing items produced according to the present invention with a casing for a front joining device and transmission for an actuation rod of the rear joining device;

Figure 1:
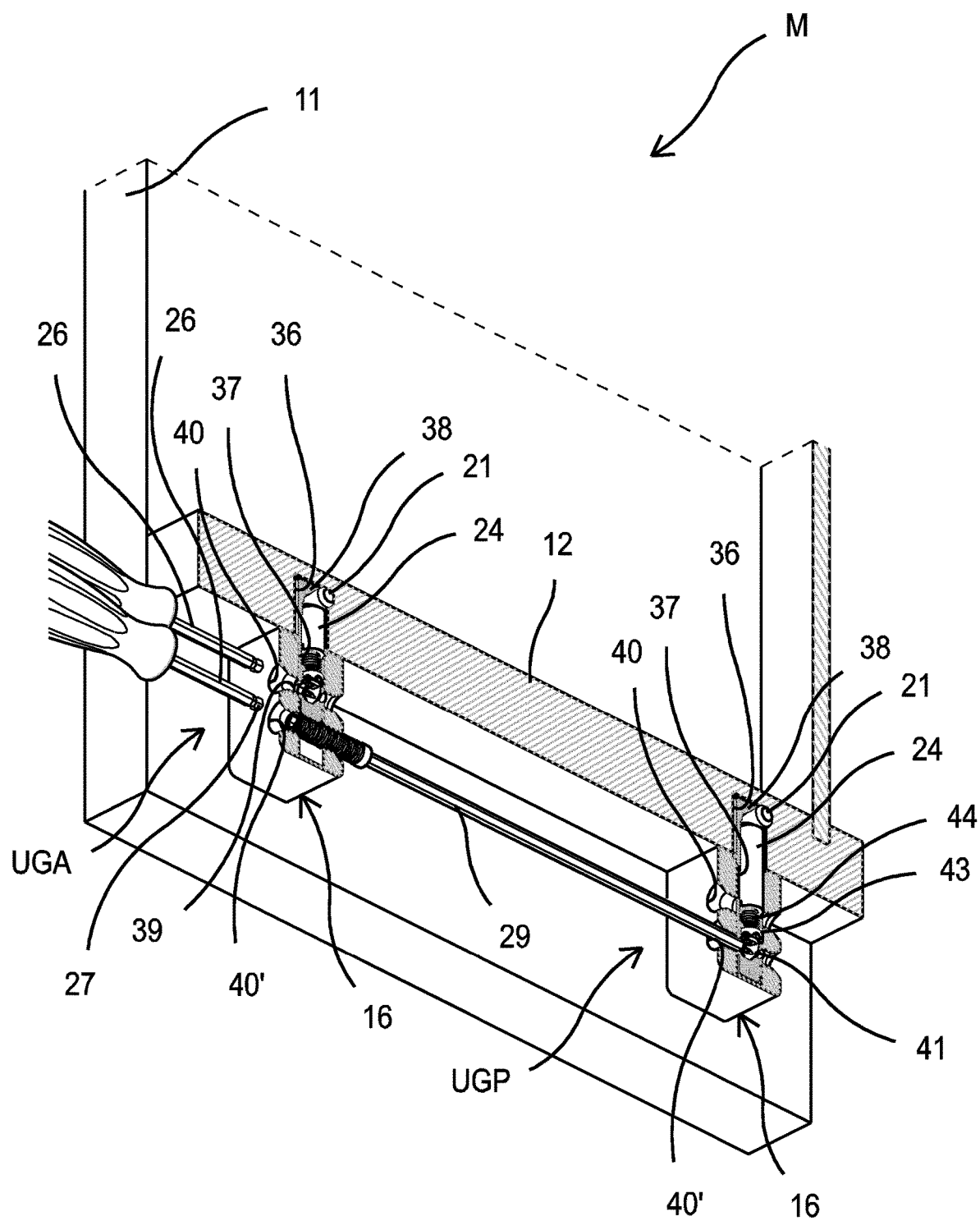
Figure 2:
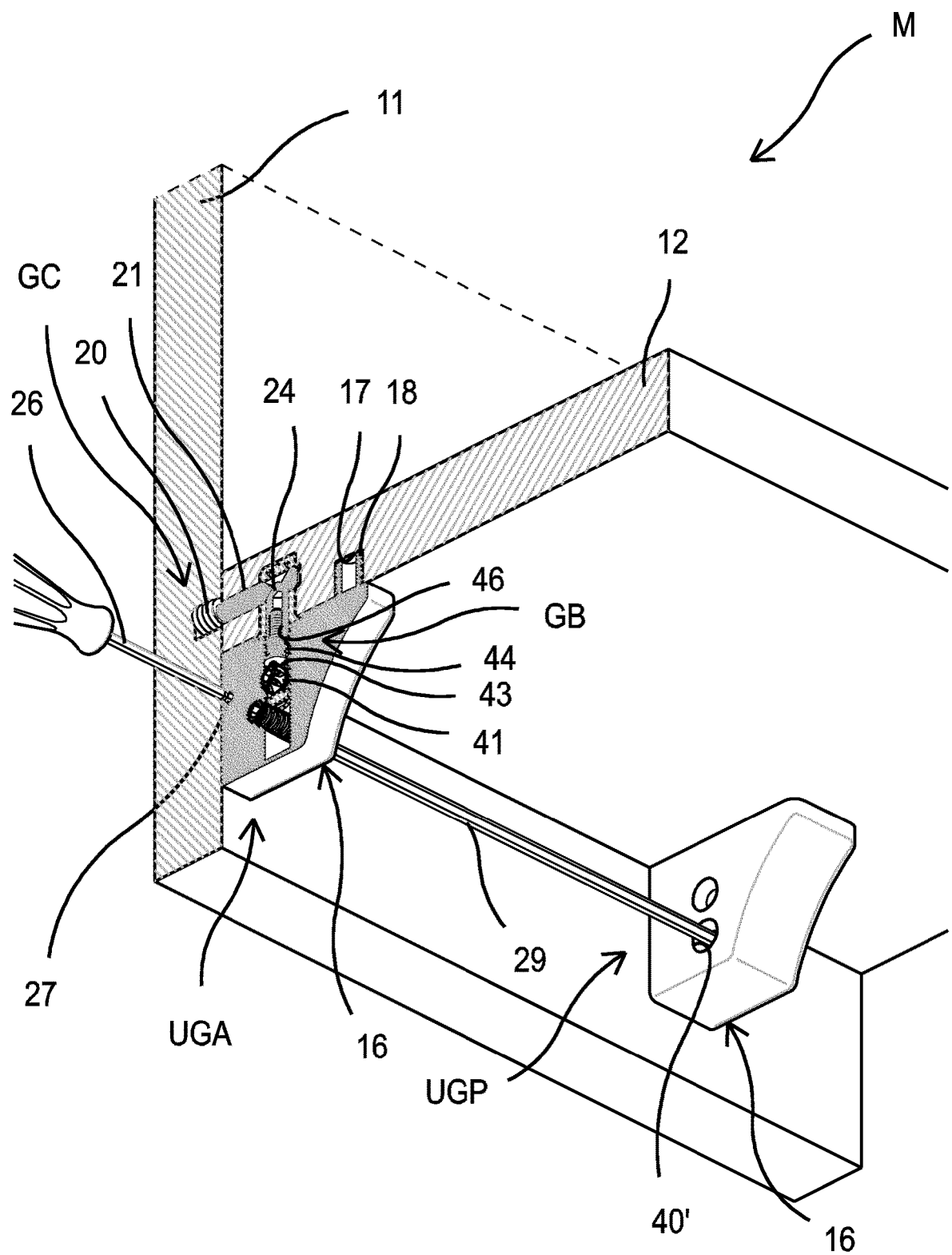
Figure 3:
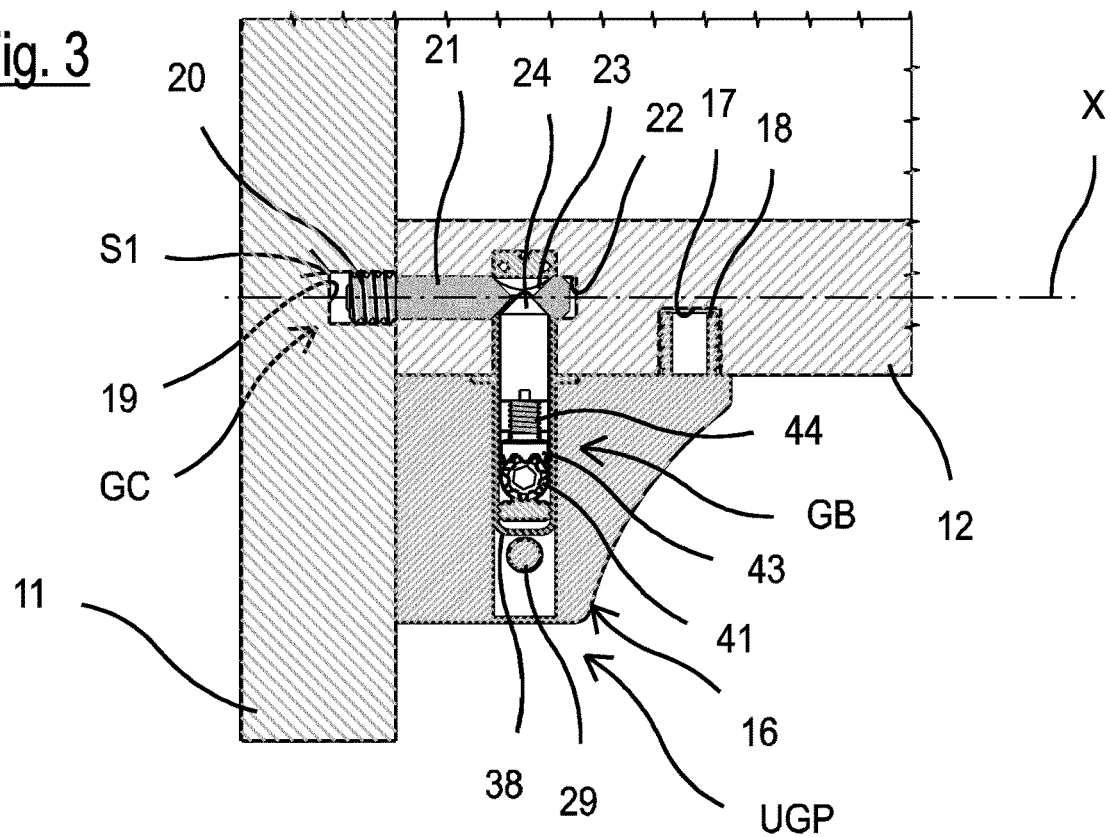
FIGS. 3 and 4 are cross-sectional views according to a vertical plane in correspondence with the front joining device and transmission for an actuation rod and the rear joining device as shown in FIG. 2.
Figure 4:
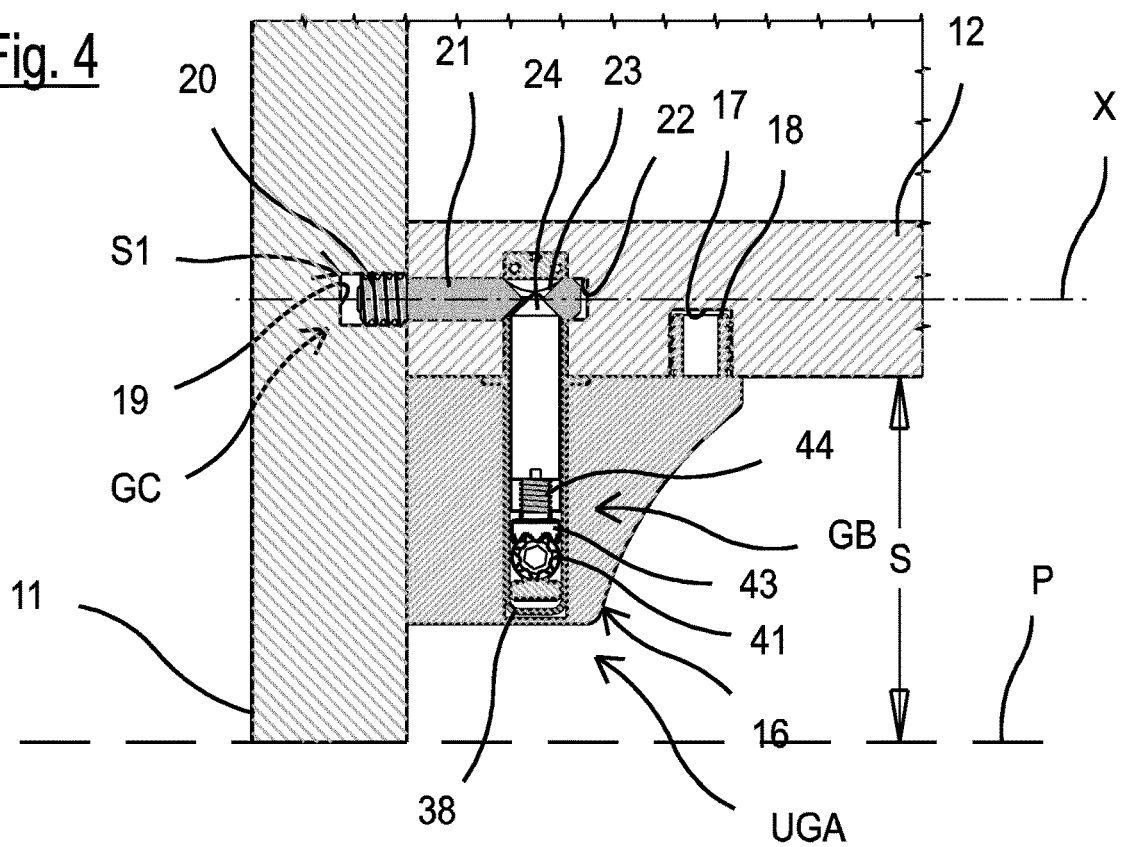
Figure 5:
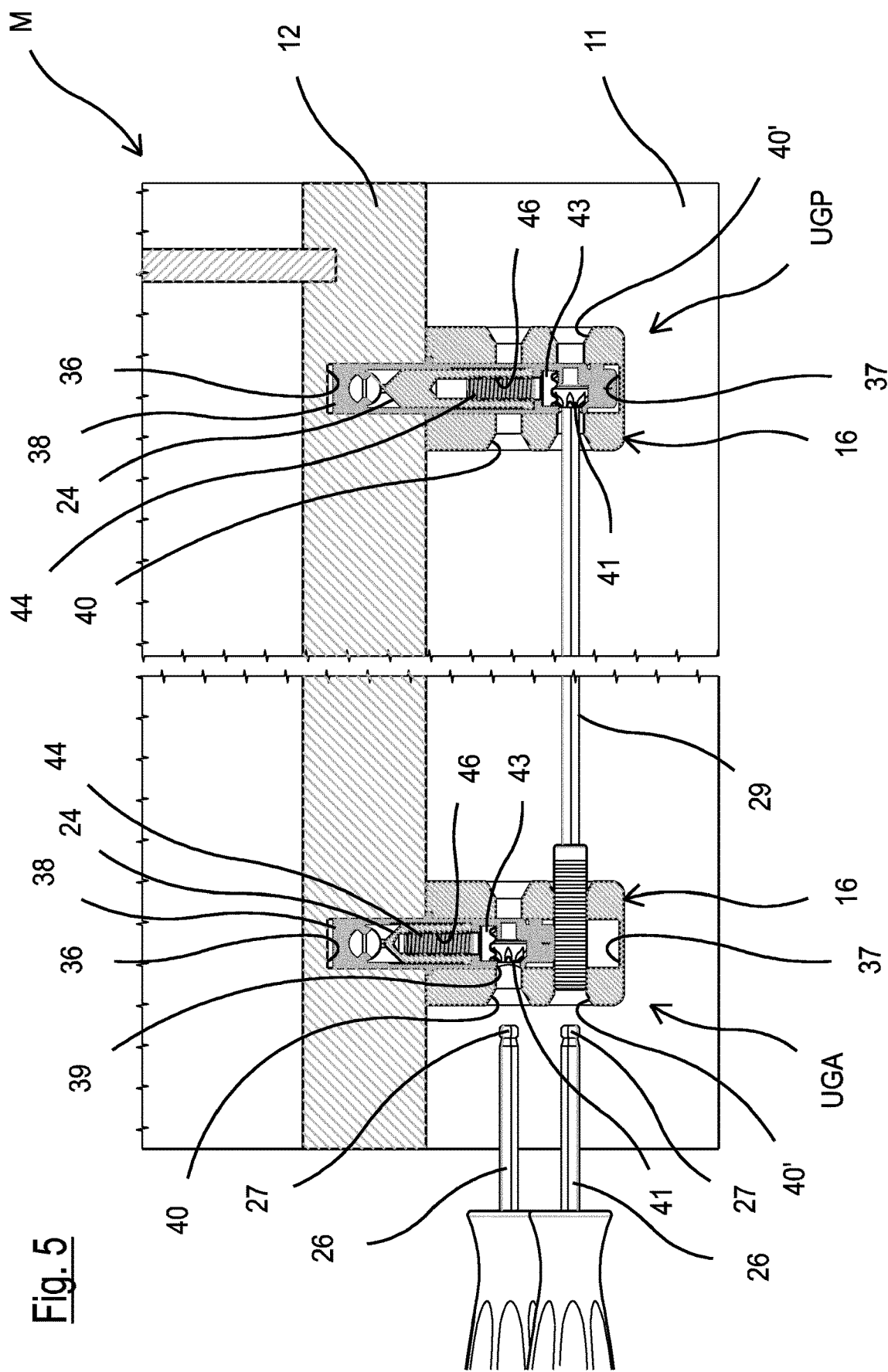
FIG. 5 is a front sectional view according to a vertical plane in correspondence with the front joining device and transmission for an actuation rod and the rear joining device as shown in FIG. 1.
Figure 6:
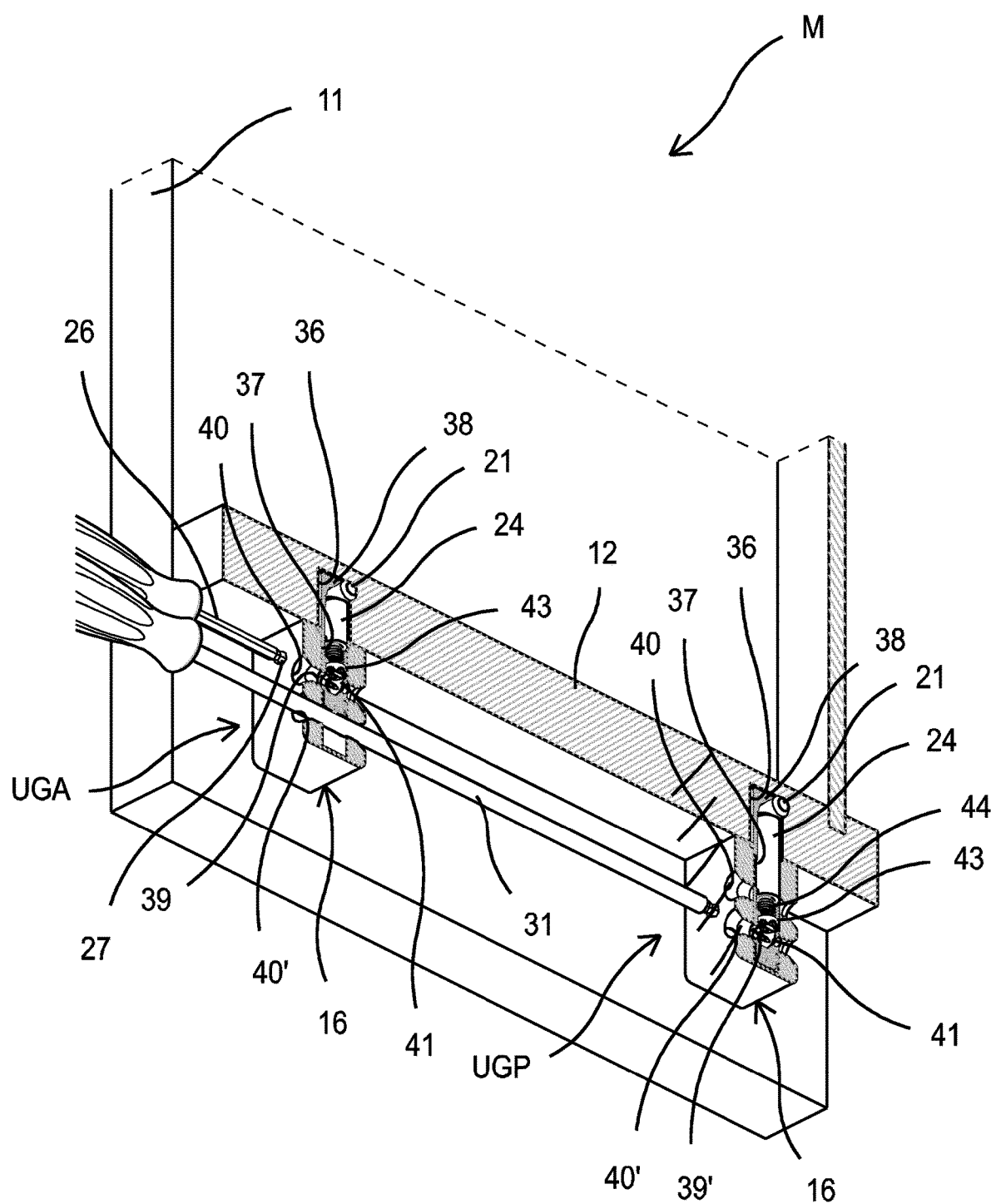
Figure 7:
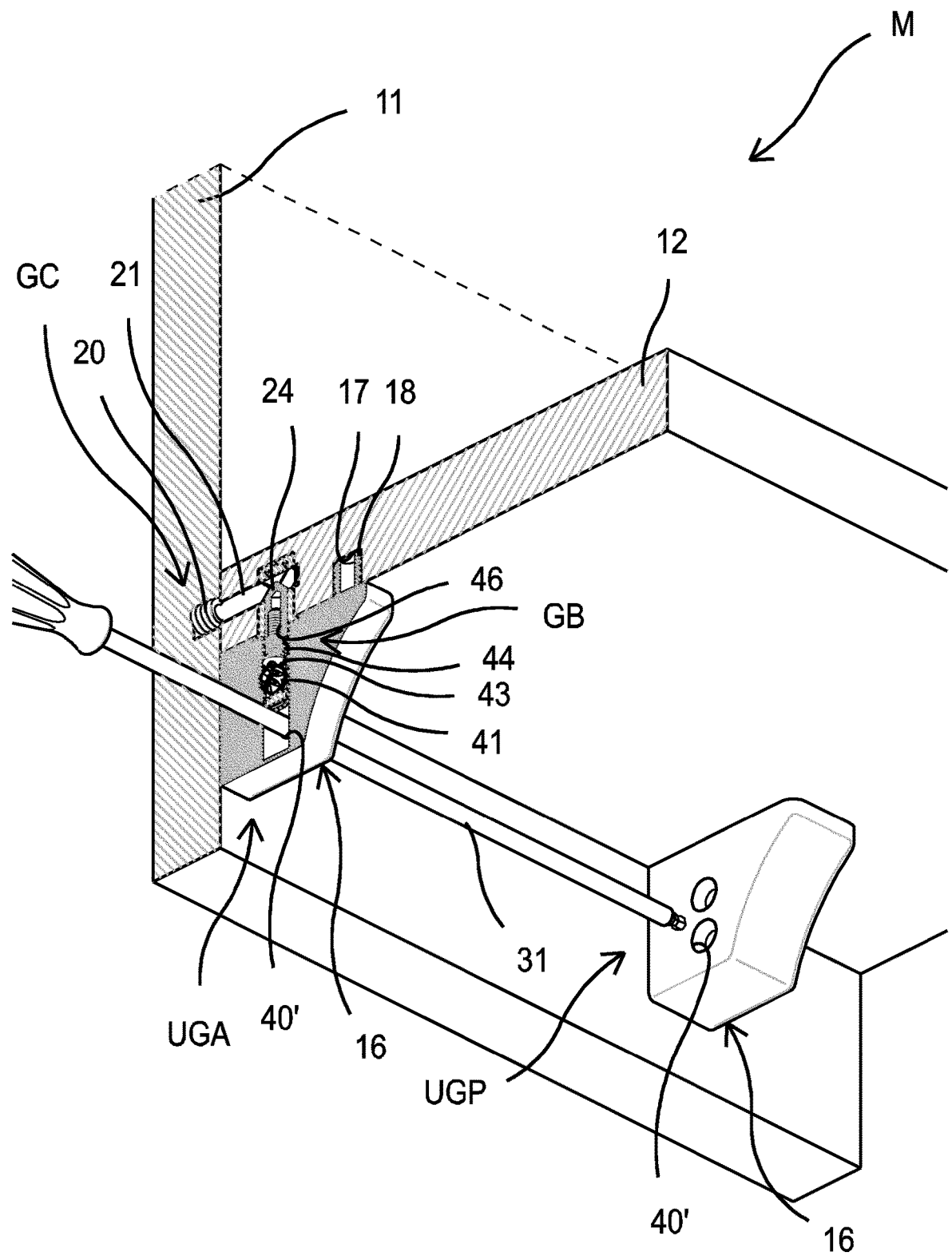
Figure 8:
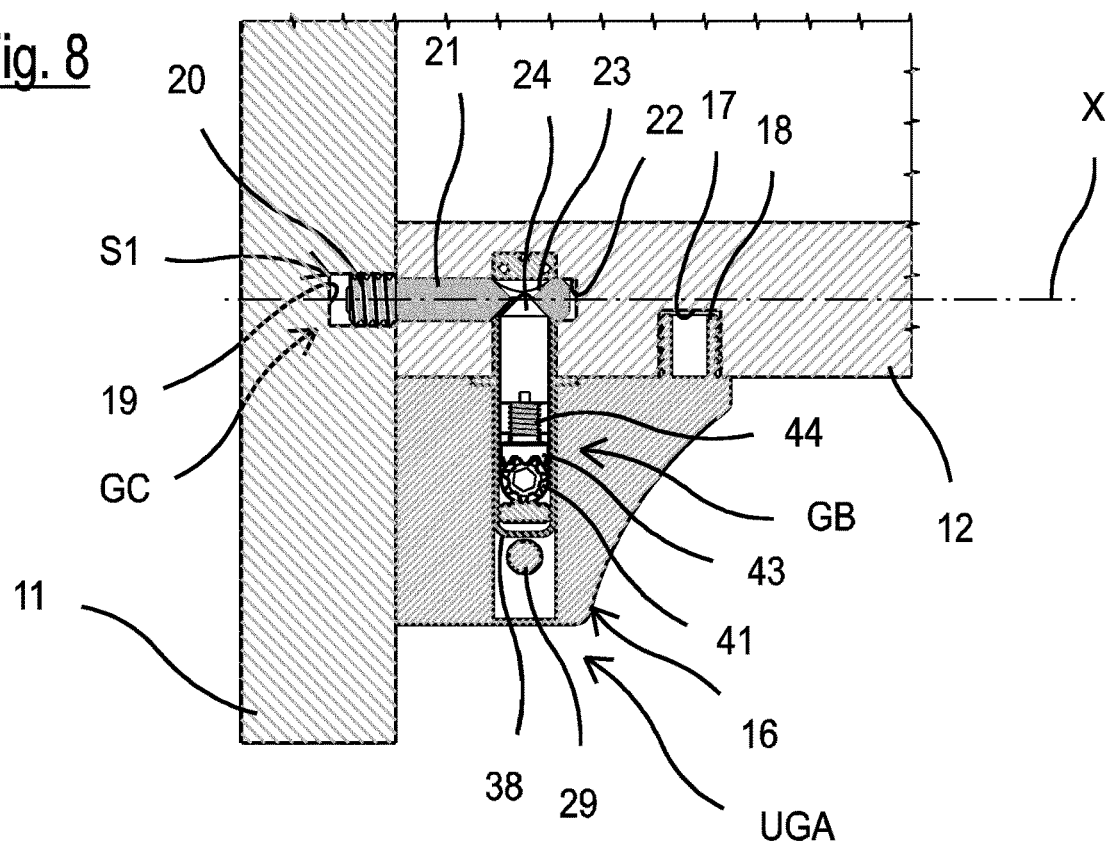
Figure 9:
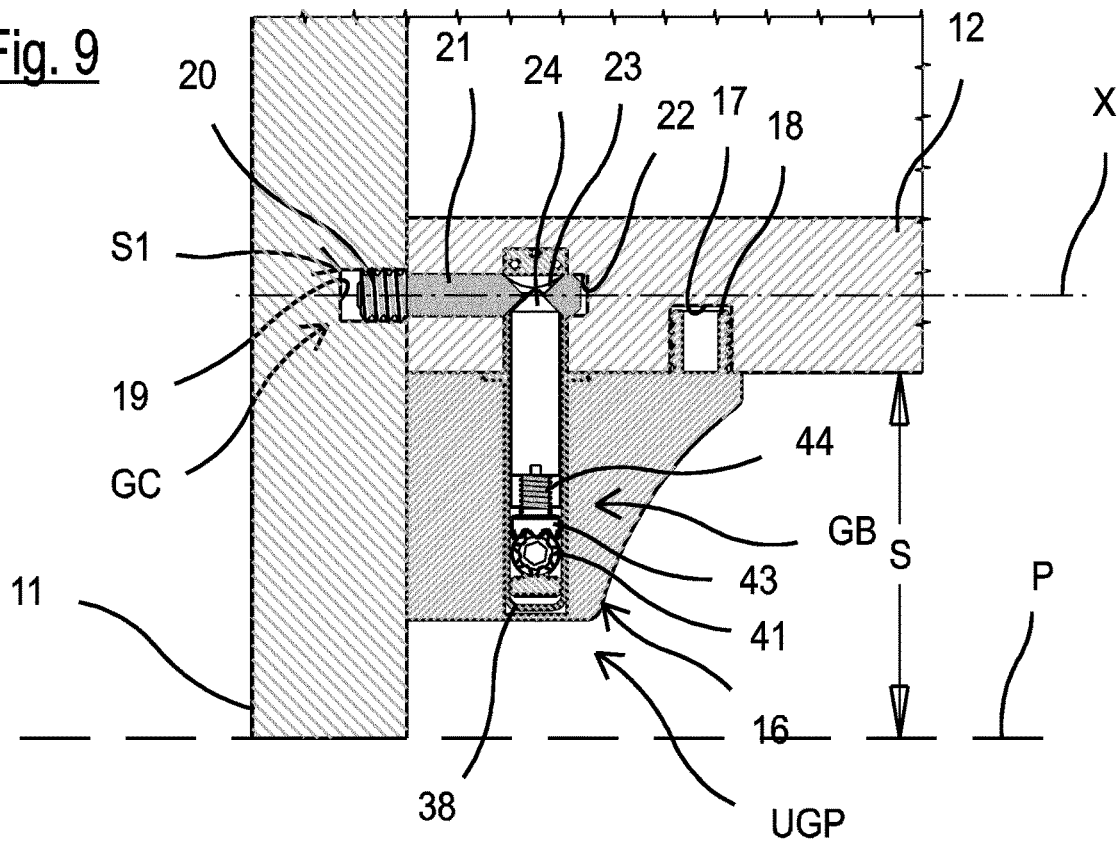
Figure 10:
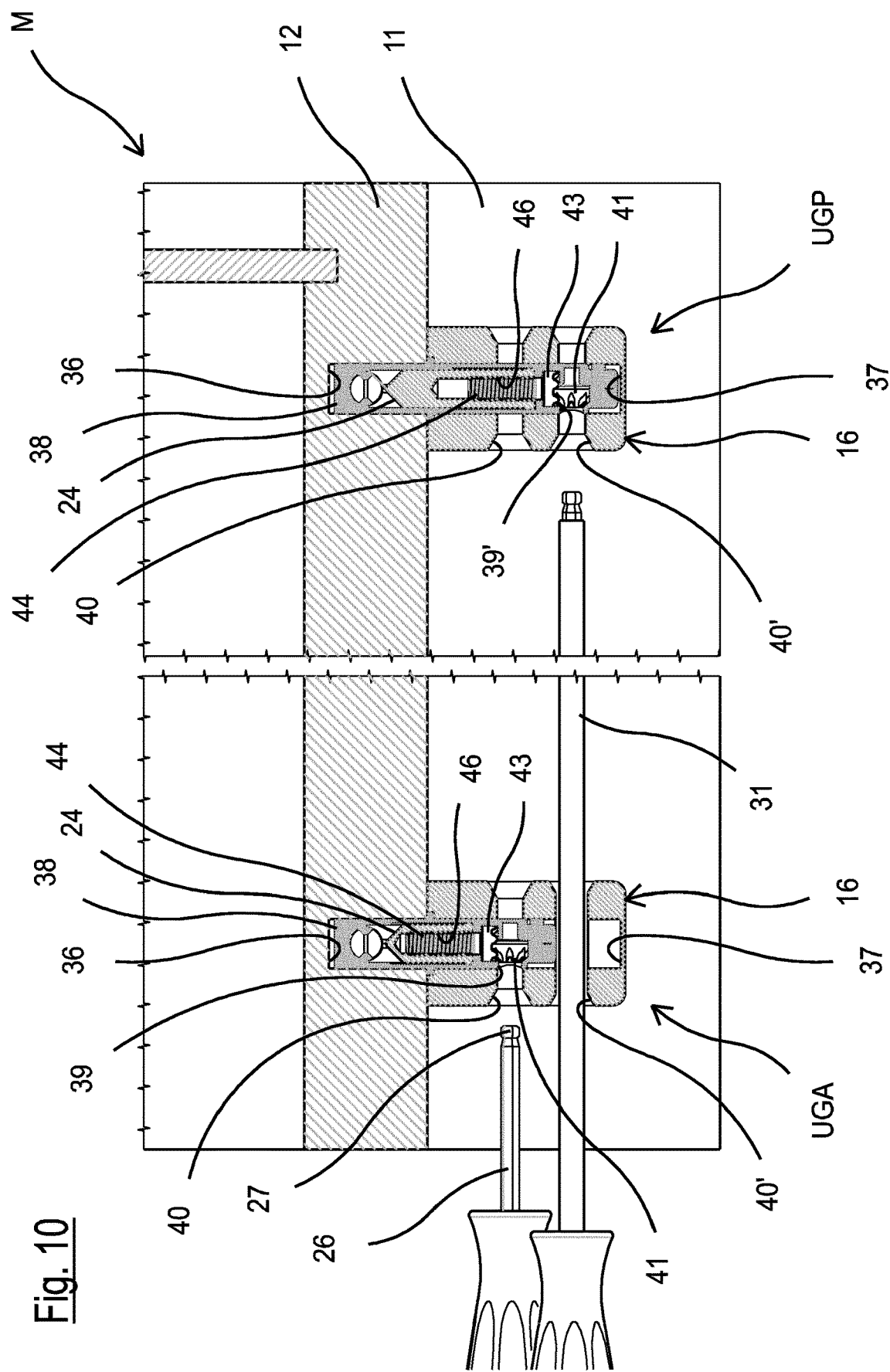
Figure 11:
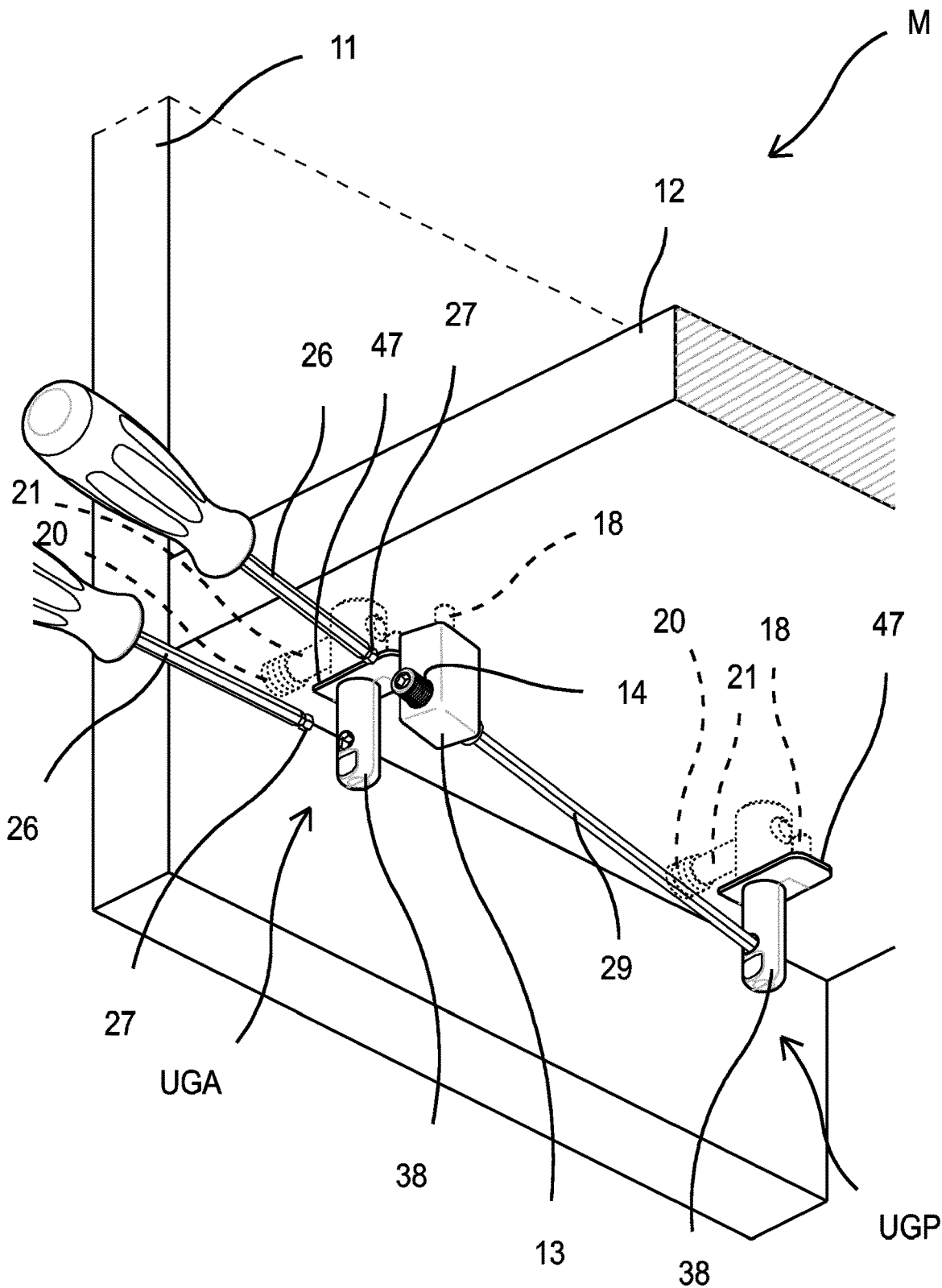
Figure 12:
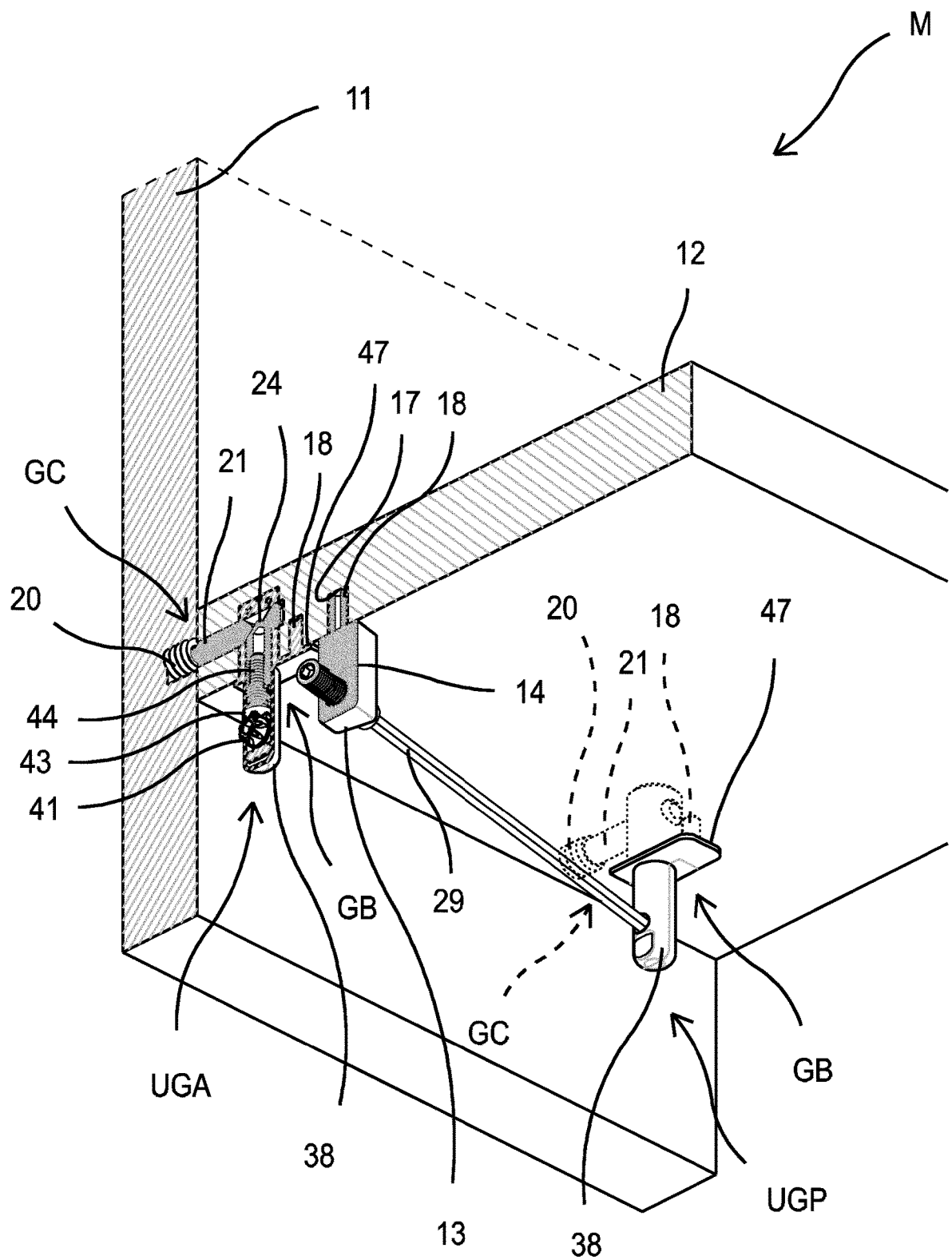
Figure 13:
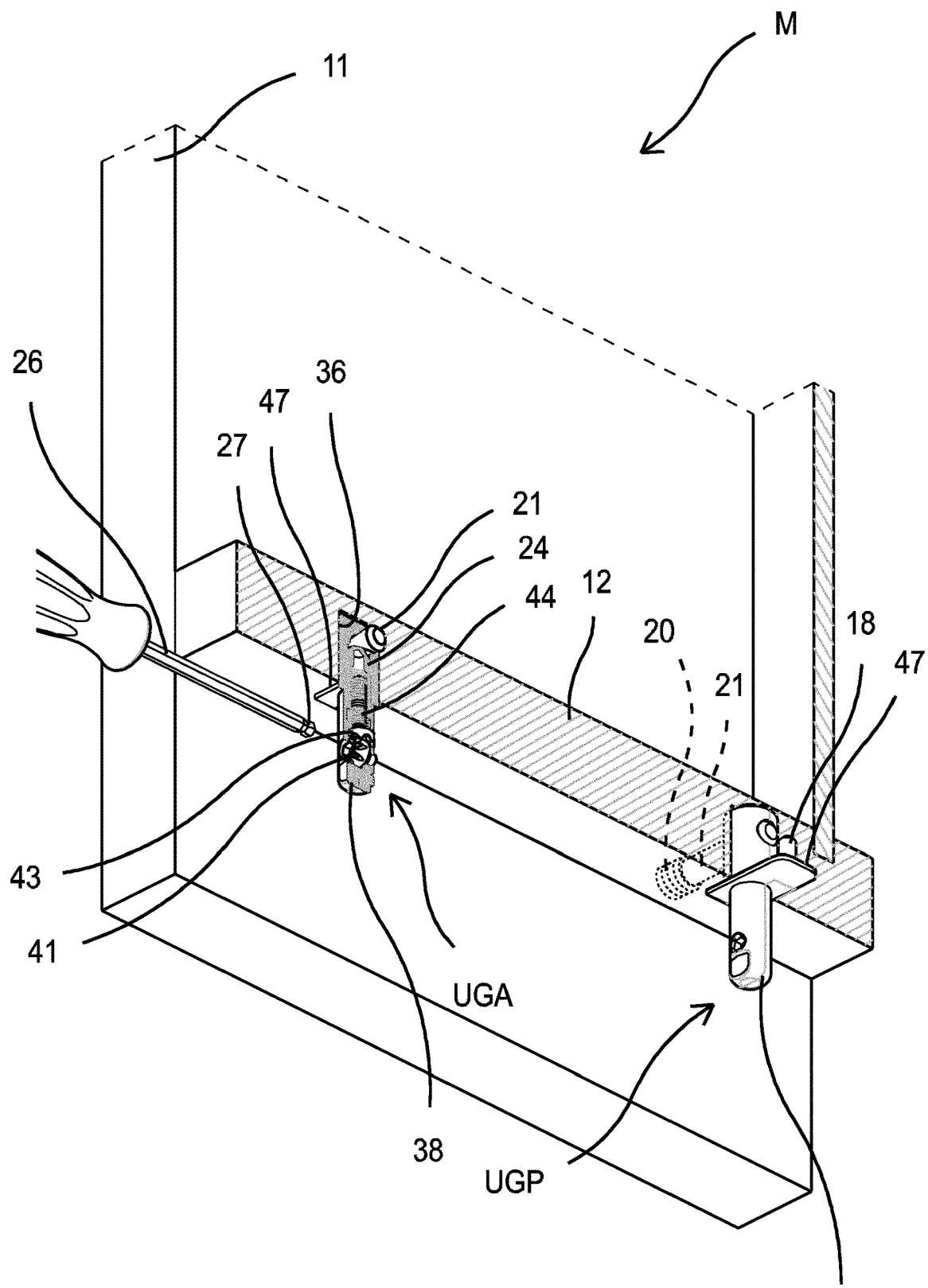
Figure 14:
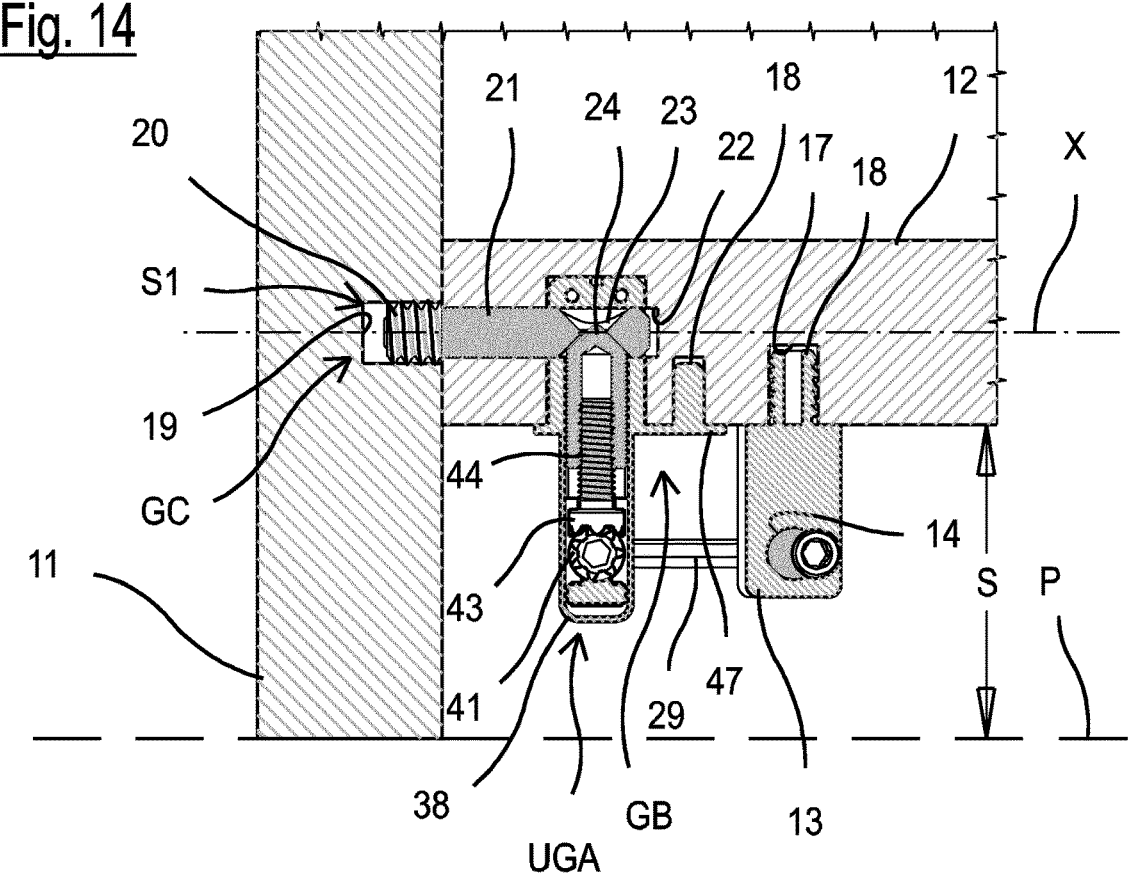
Figure 15:
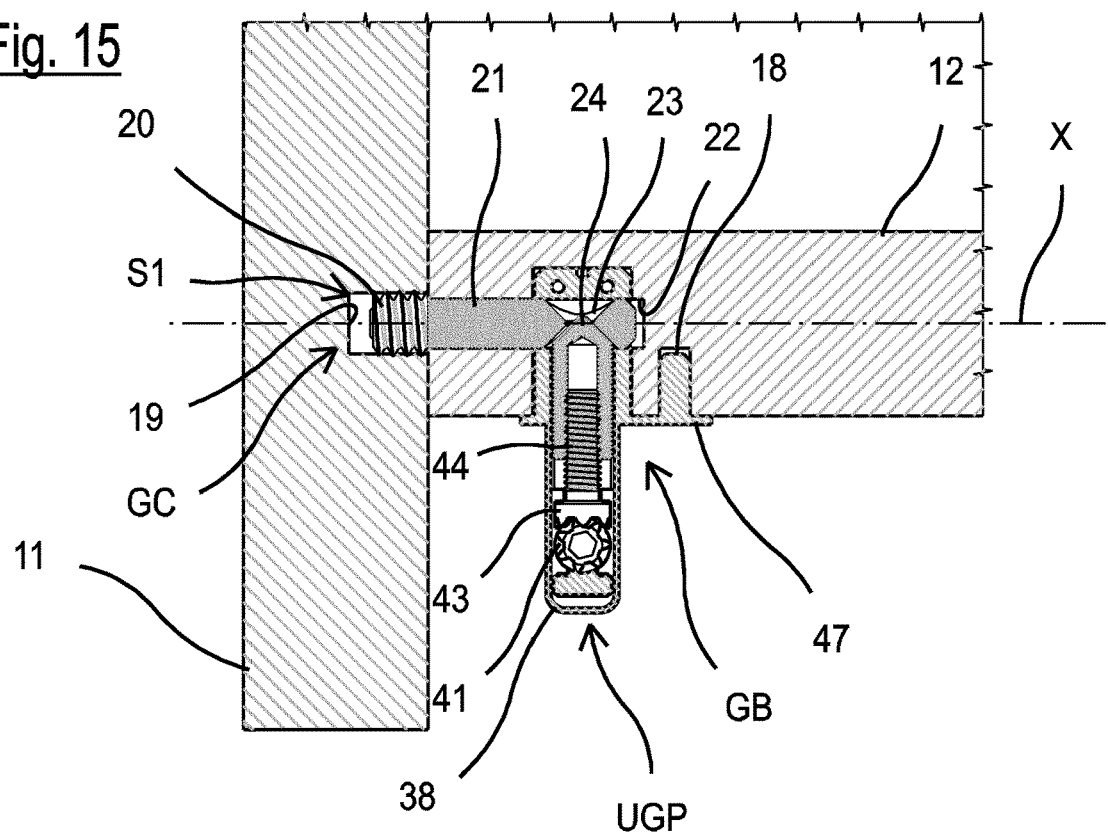
Figure 16:
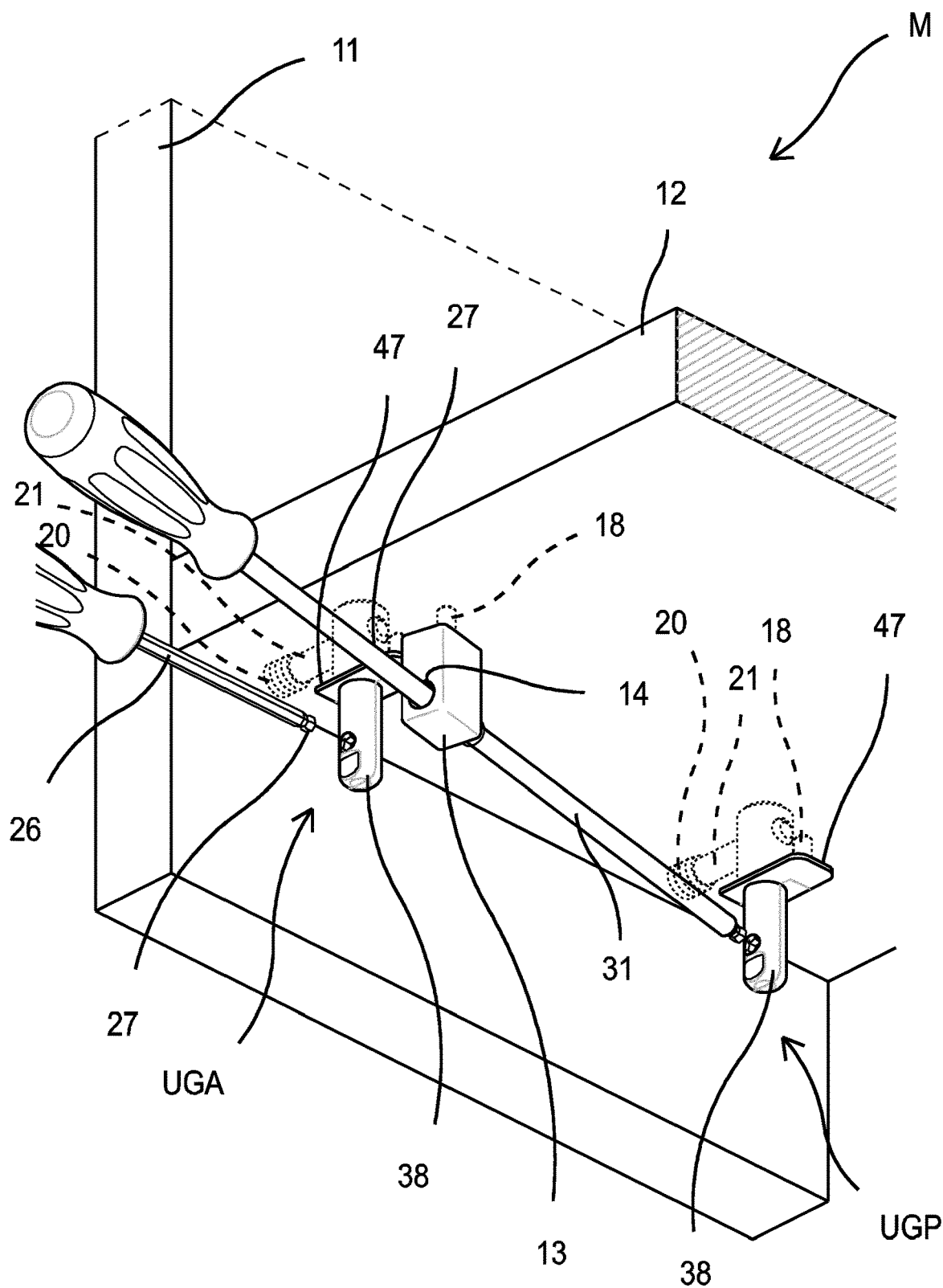
Figure 17:
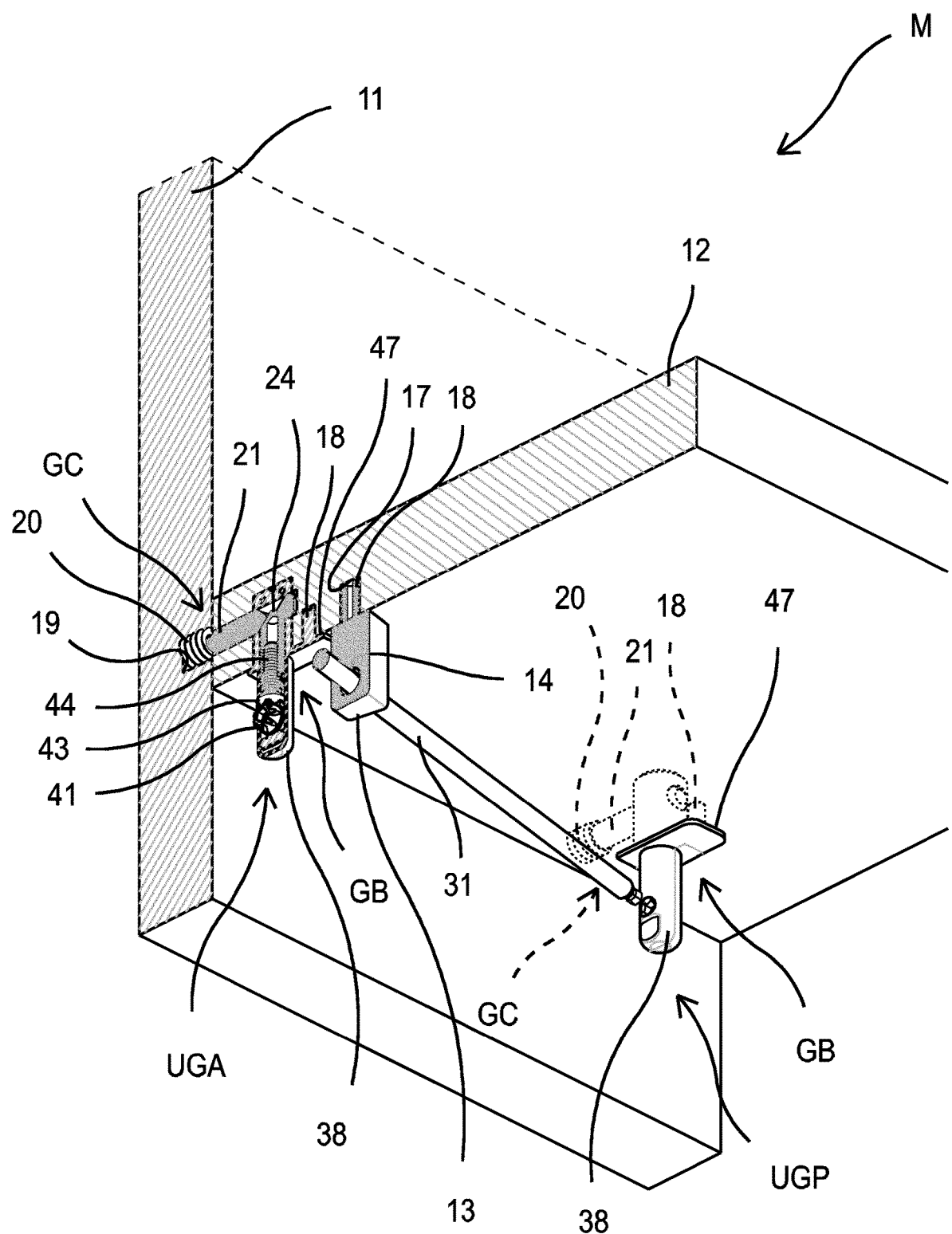
Figure 18:
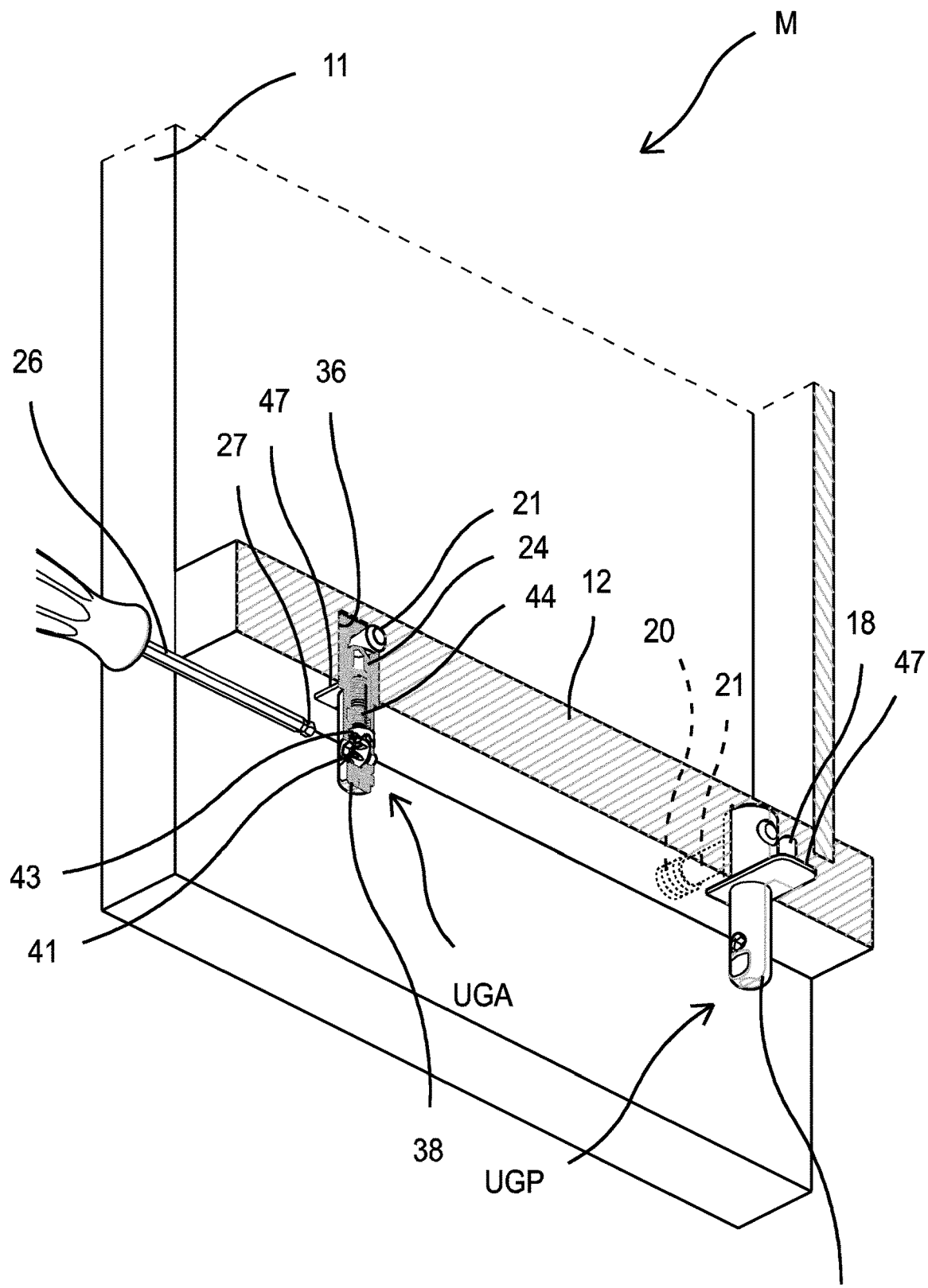
Figure 21:
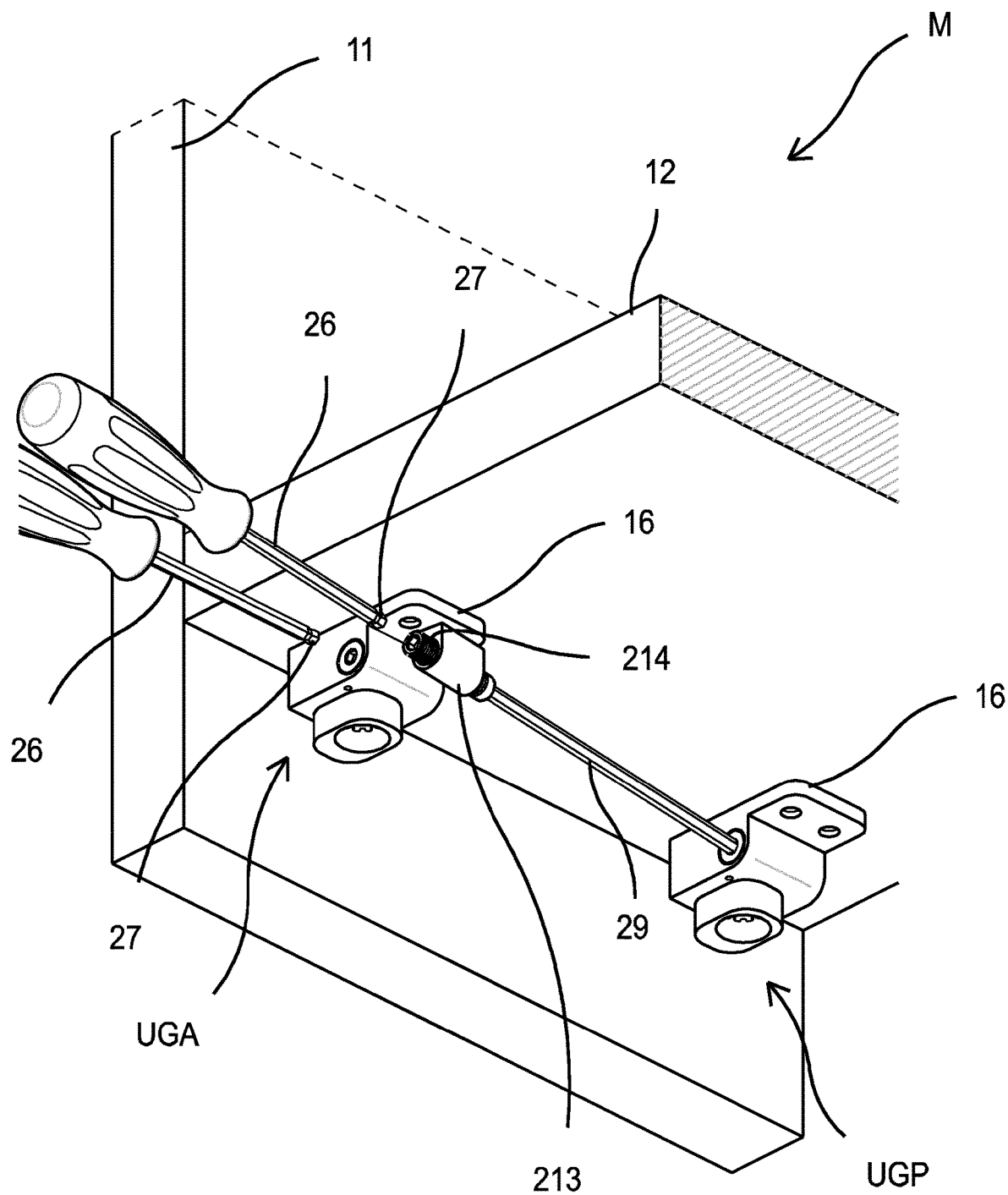
Figure 22:
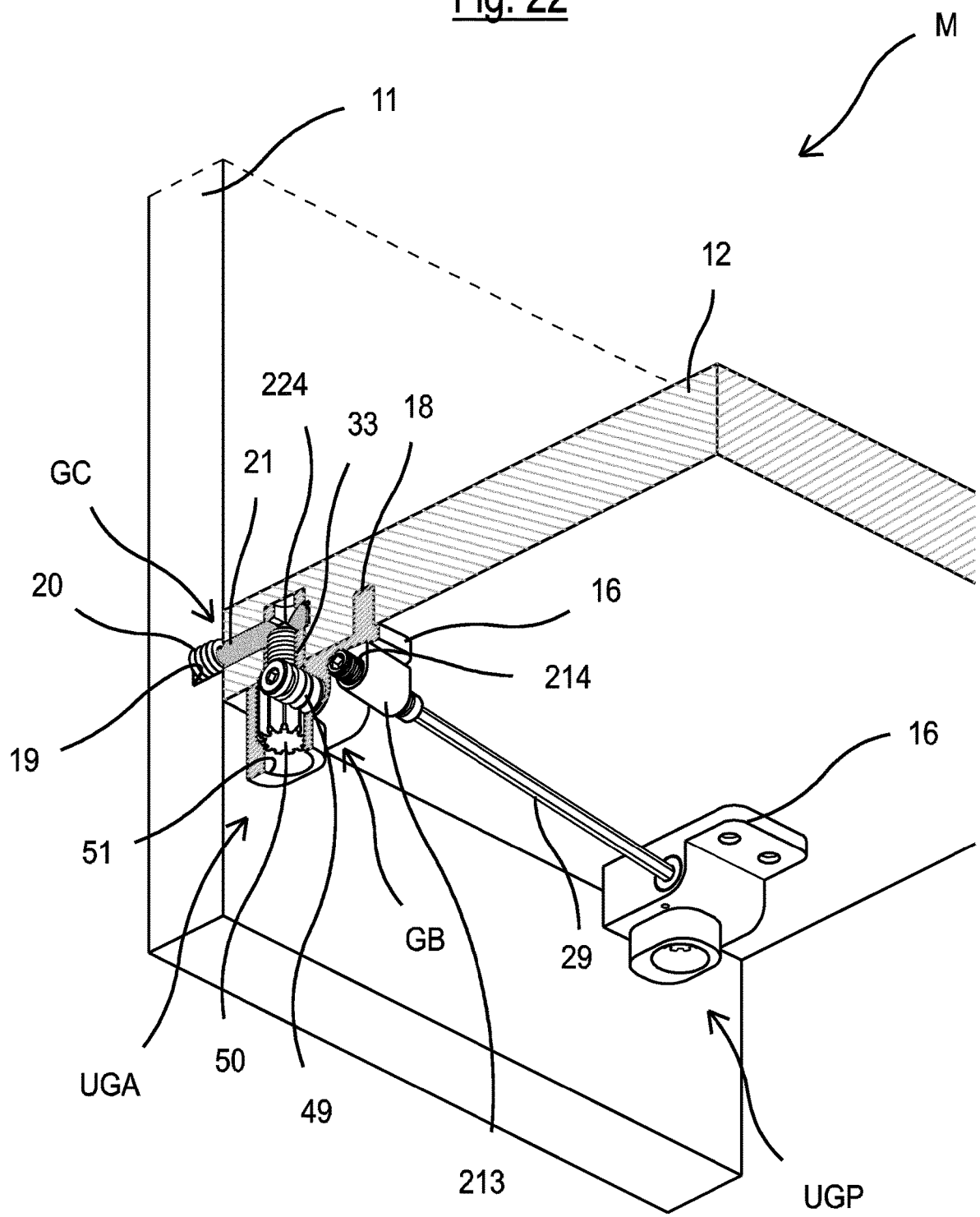
Figure 23:
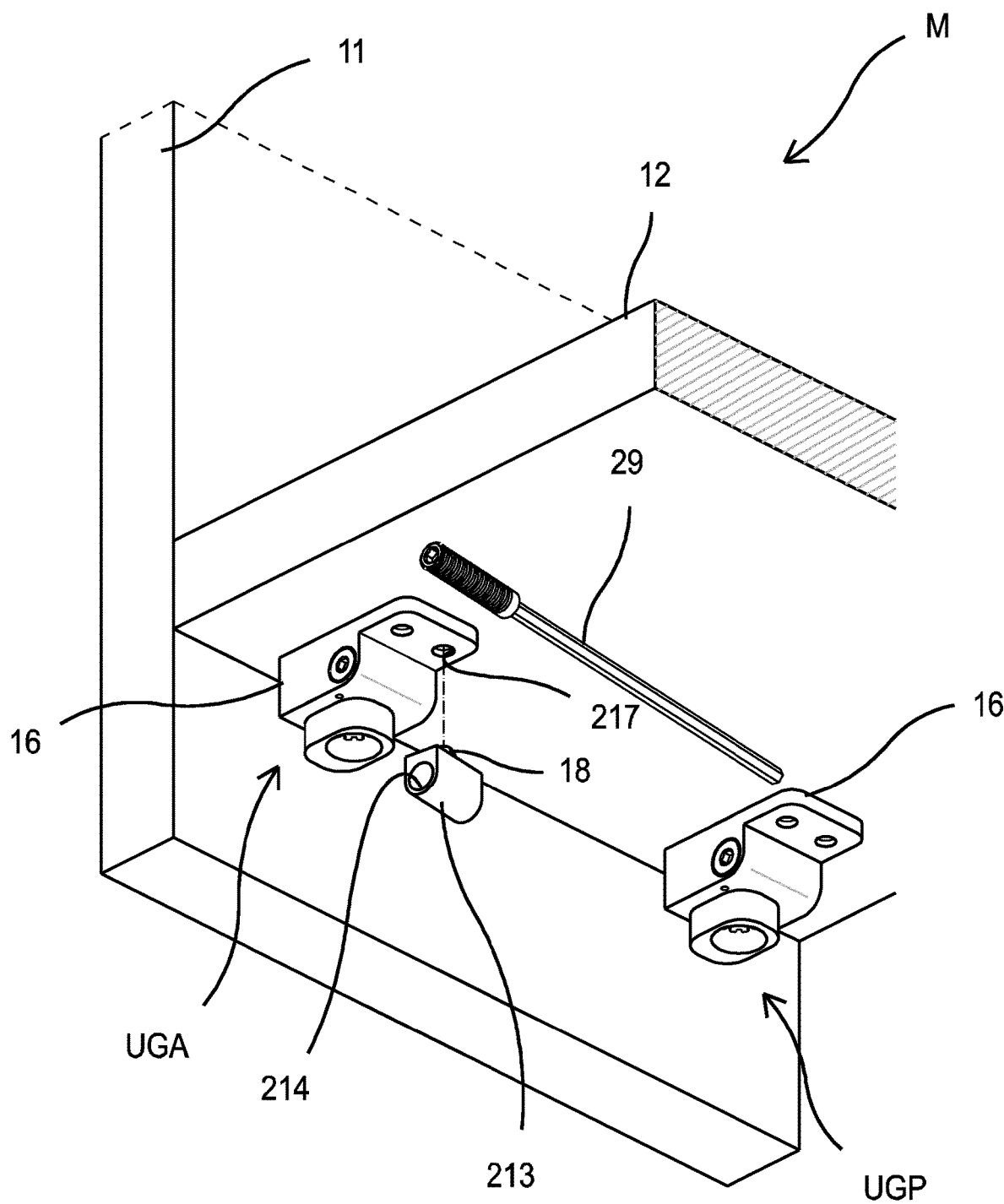
Figure 24:
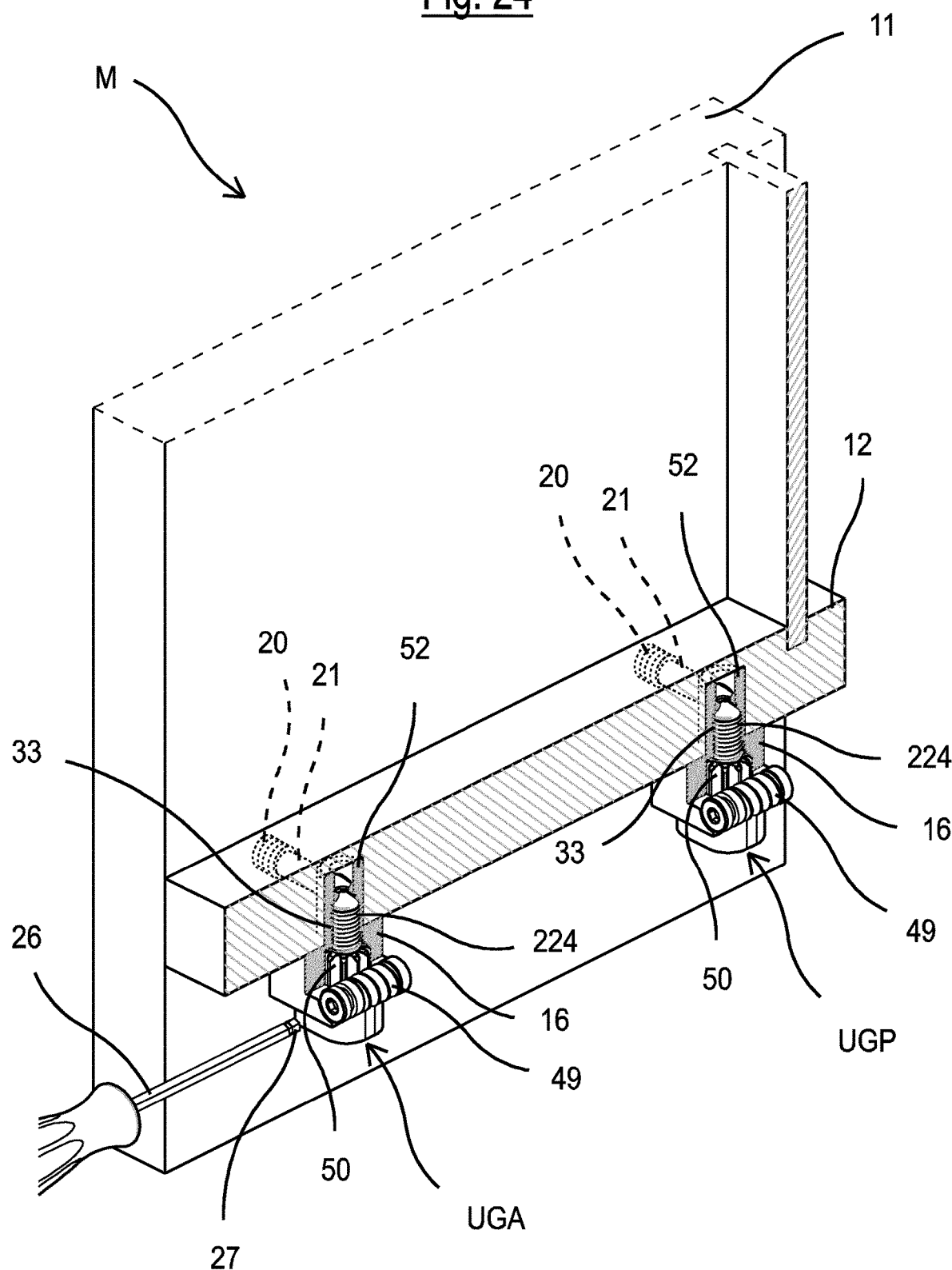
Figure 25:
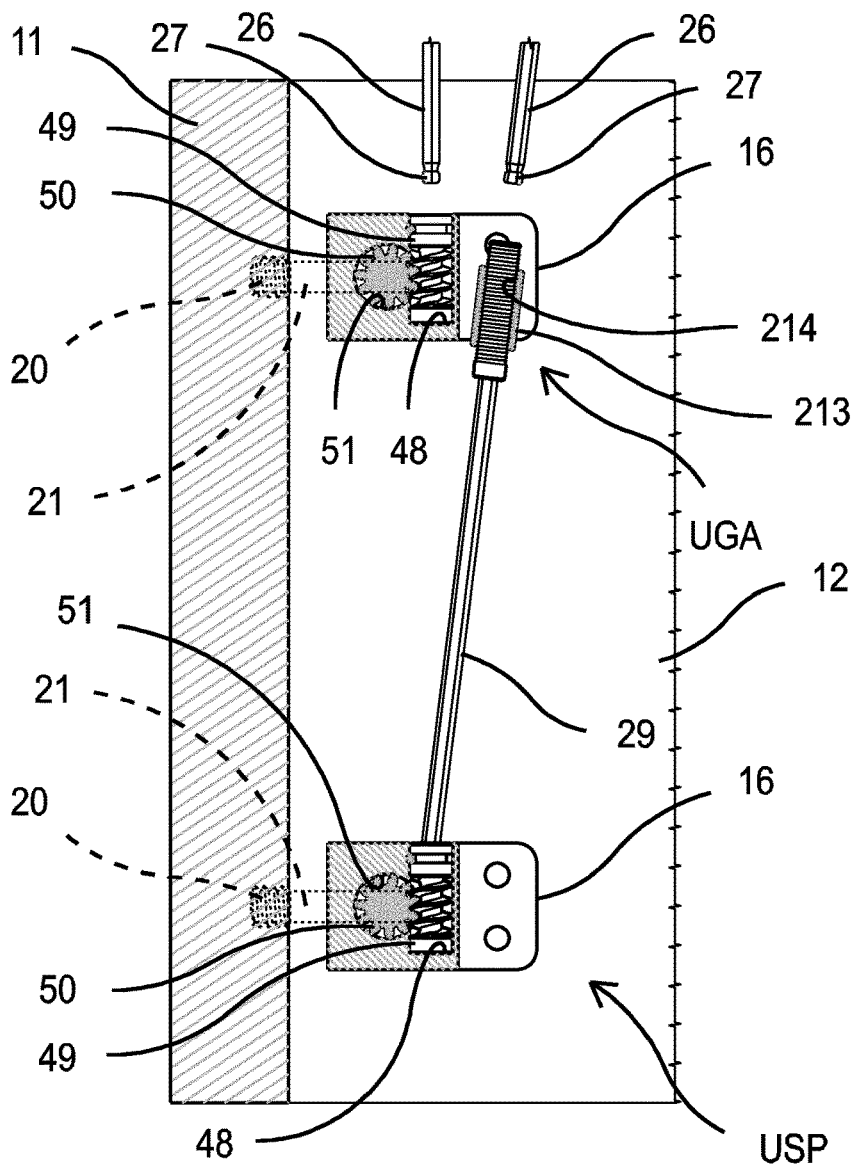
Figure 26:
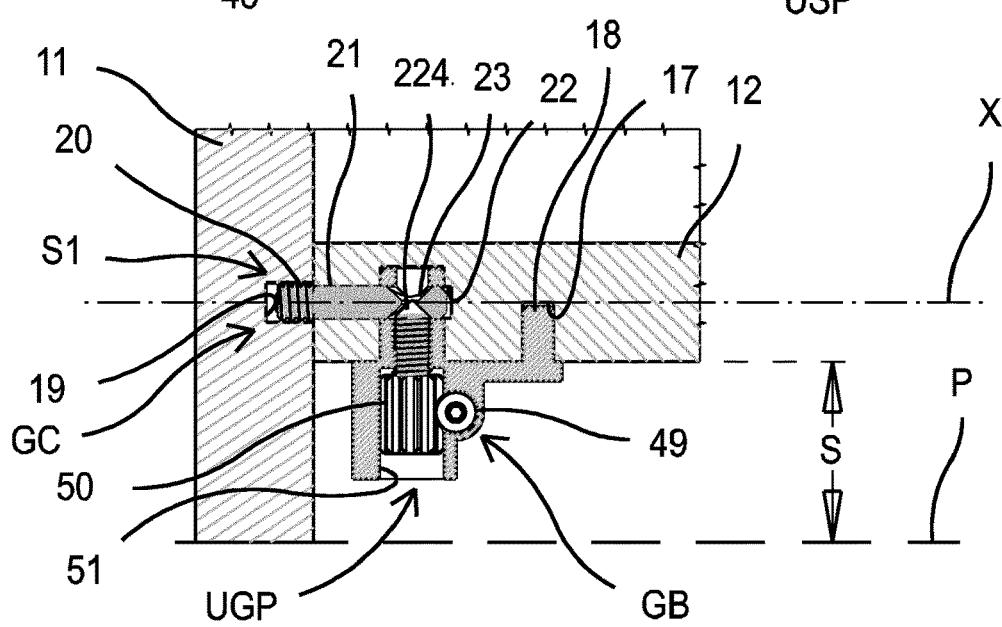
Figure 27:
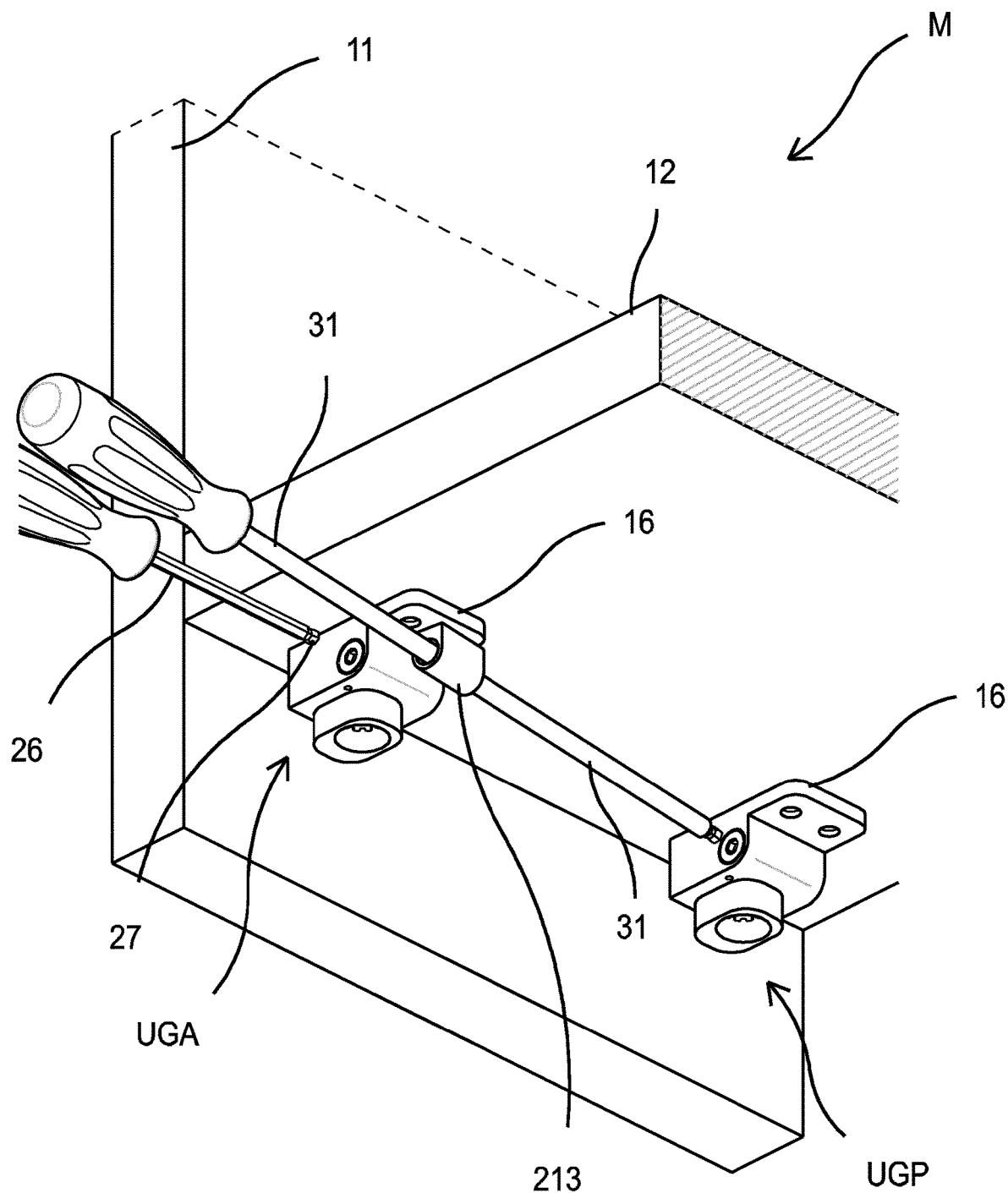
Figure 28:
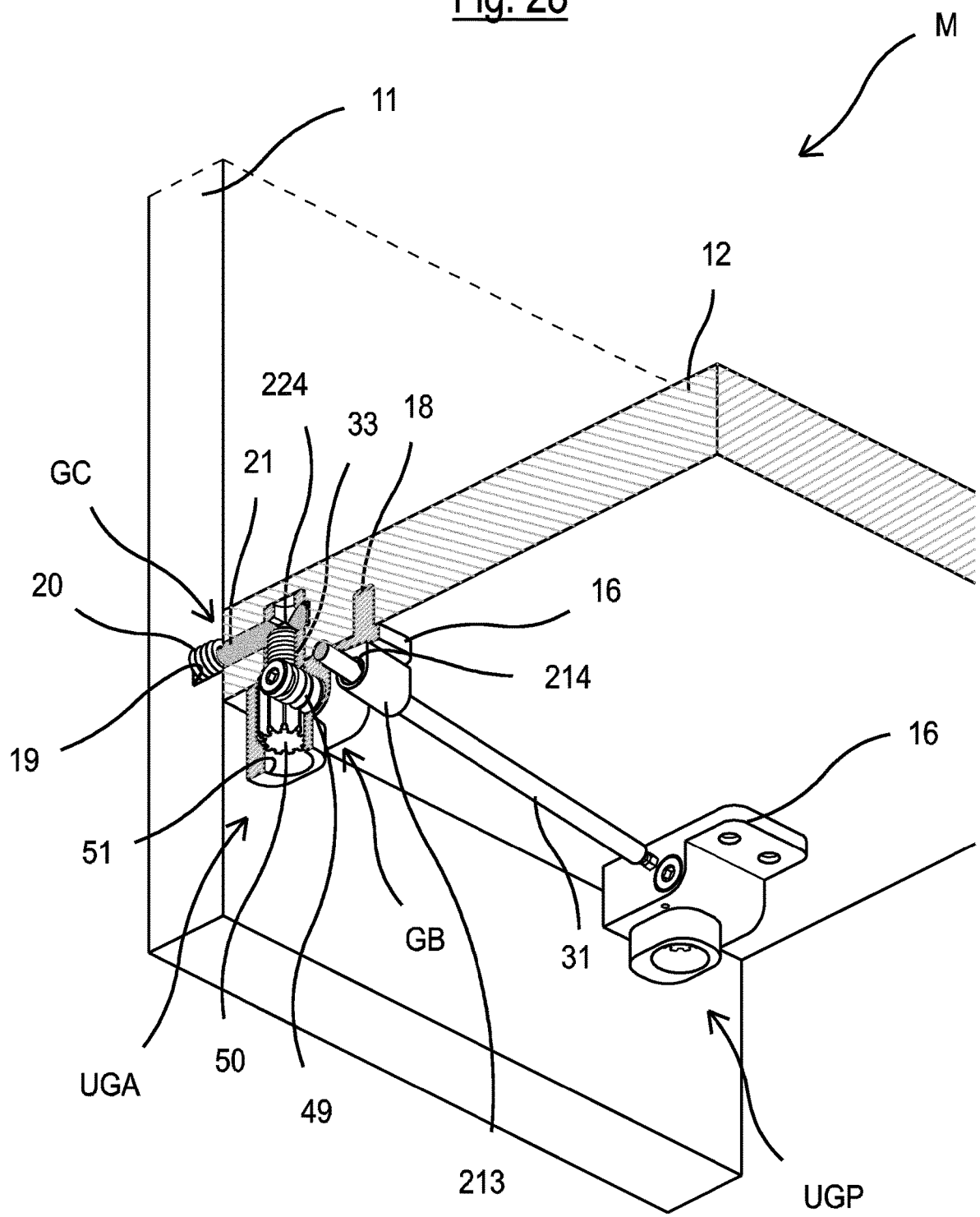
Figure 29:
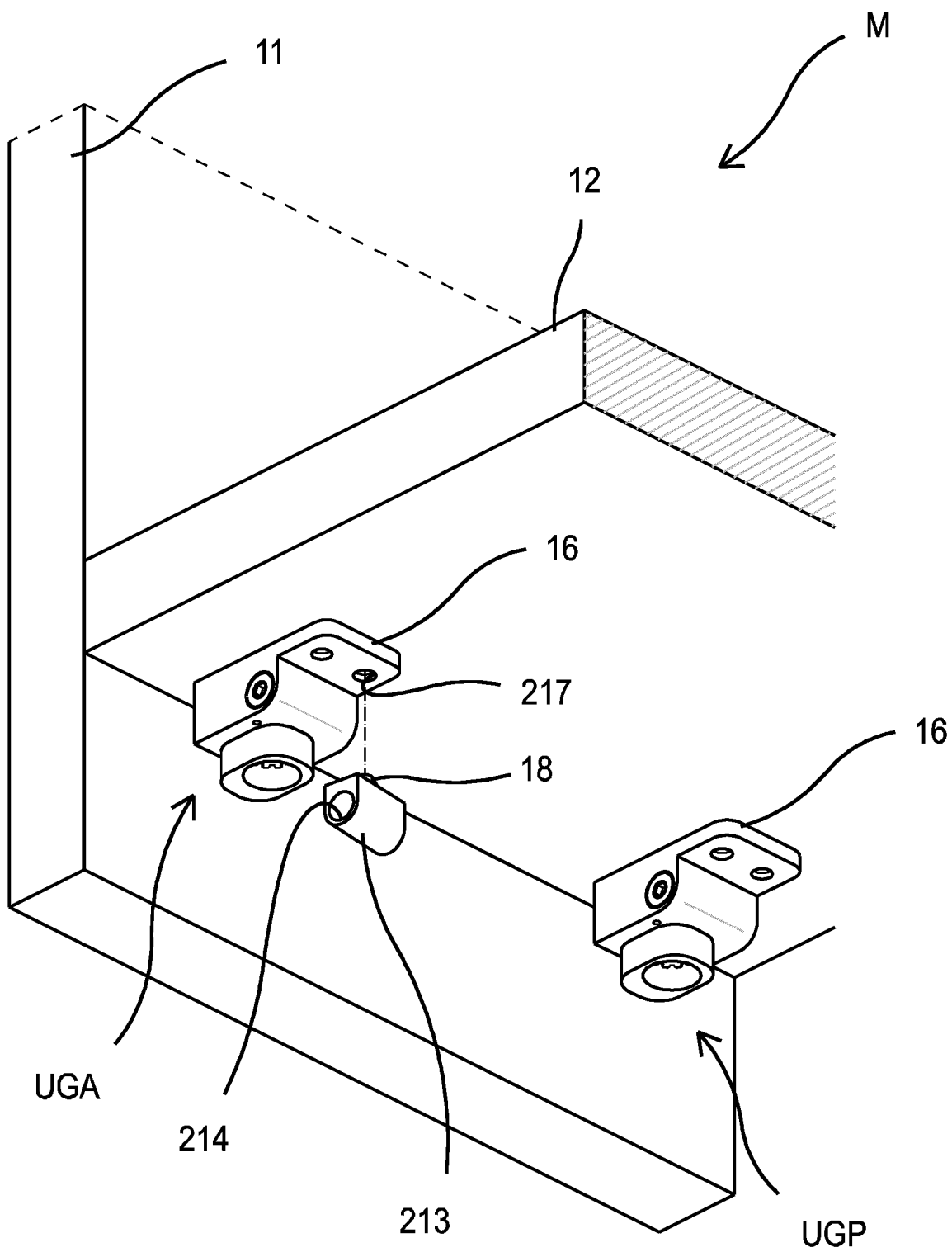
Figure 30:
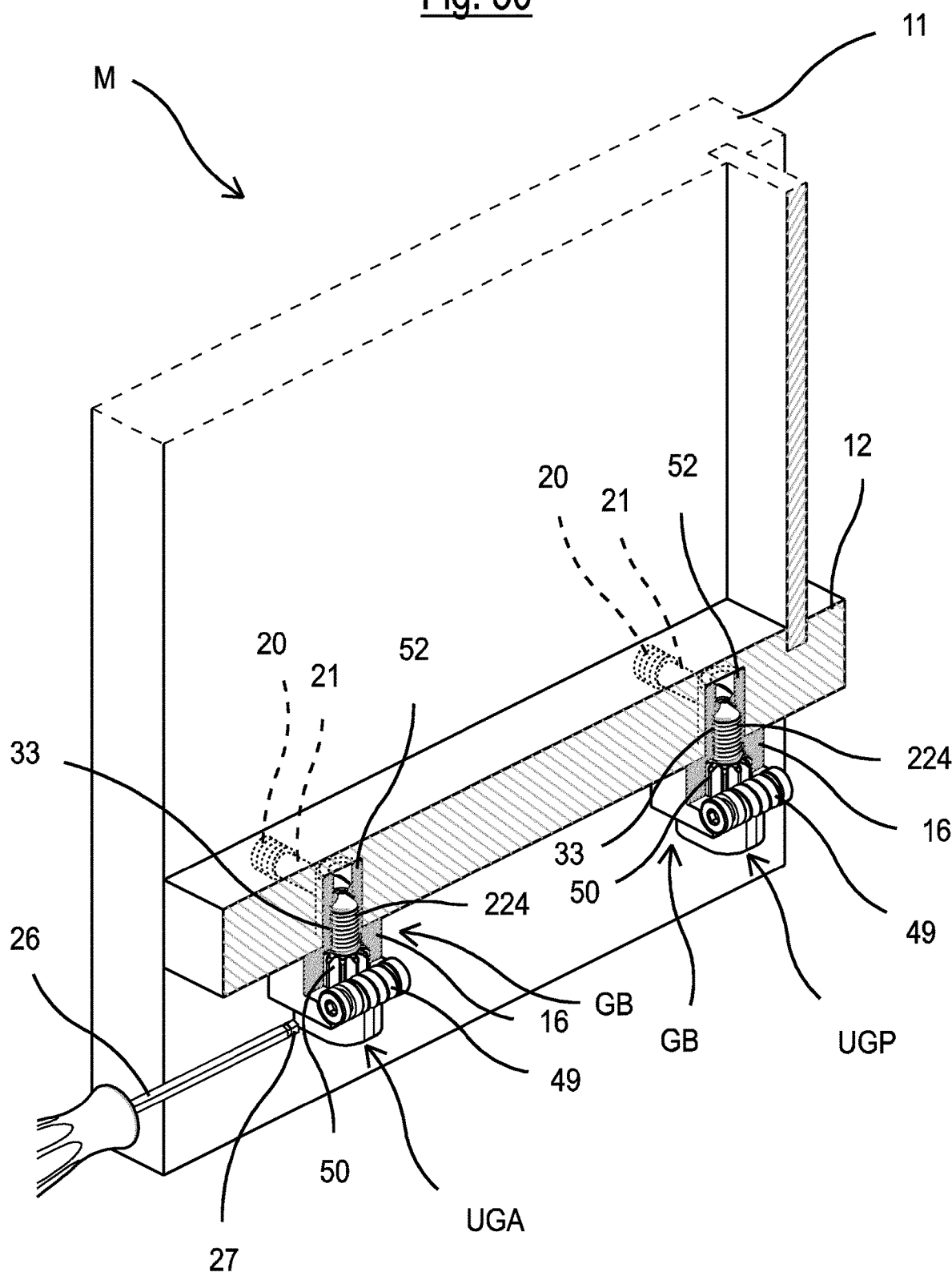
Figure 31:
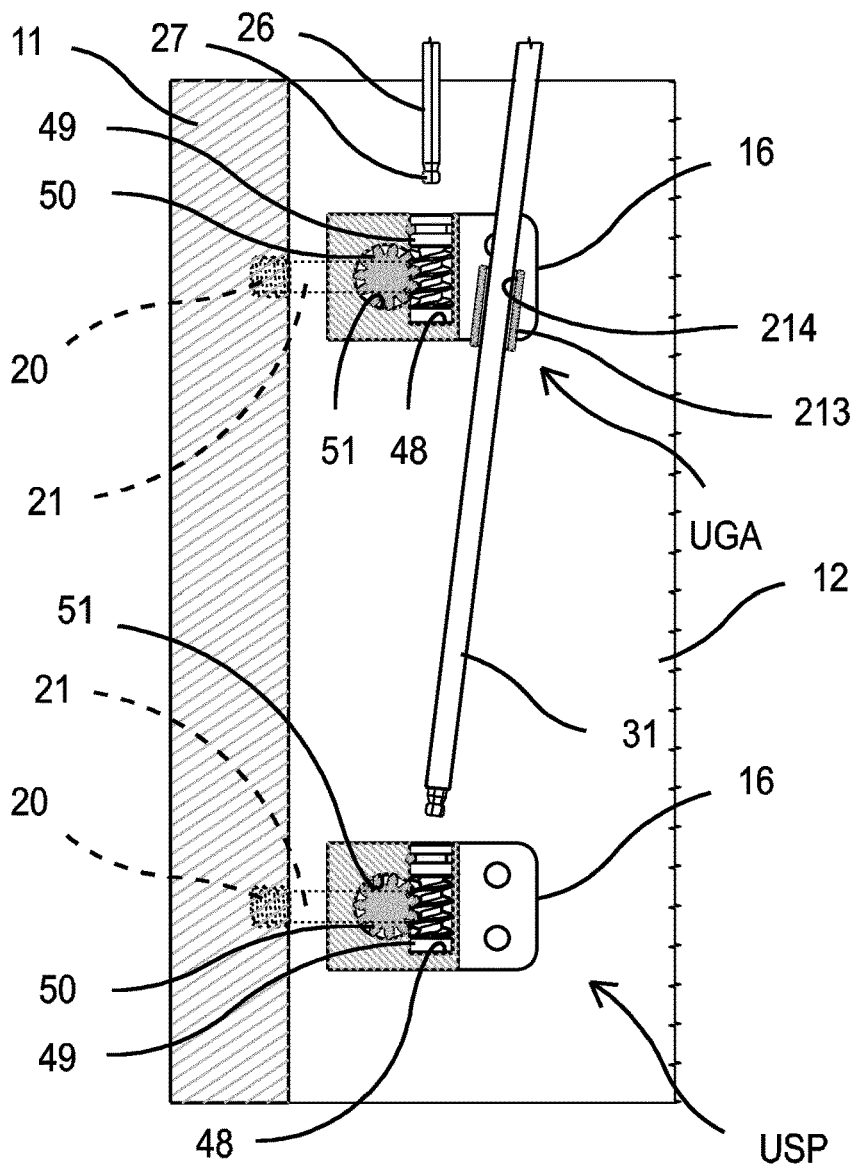
Figure 32:
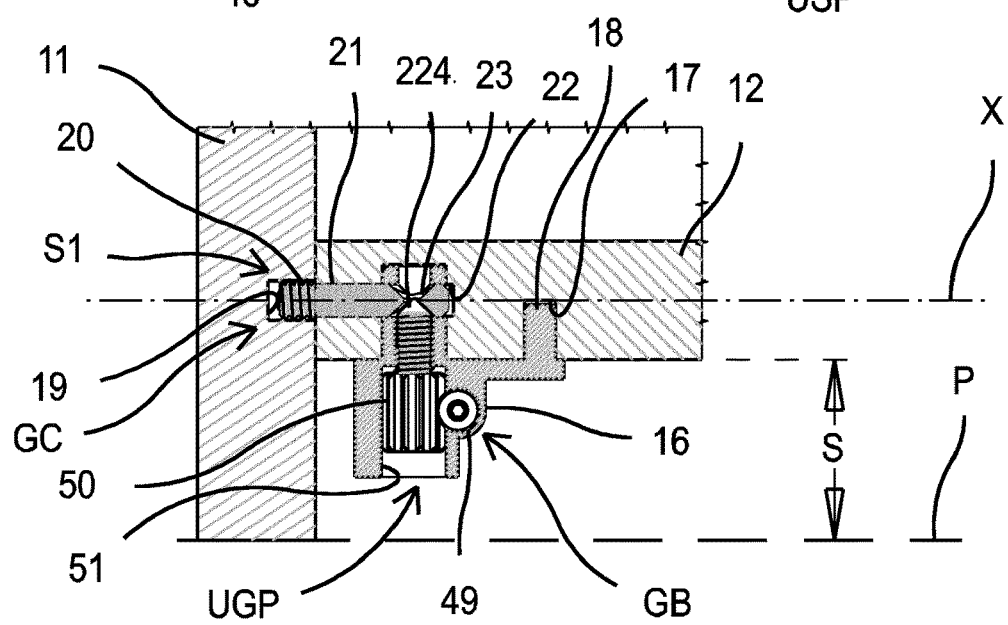

FIGS. 6 and 7 are two perspective views of a second embodiment, one partially sectional and the other enlarged with respect to the first view with a different section line, of a joining system with front actuation in axis with the thickness of a bottom of furniture and furnishing items produced according to the present invention with a casing for a front joining device and transmission for an actuation screwdriver of the rear joining device;

FIGS. 8 and 9 are cross-sectional views according to a vertical plane in correspondence with the front joining device and transmission for an actuation screwdriver and the rear joining device as shown in FIG. 7;

FIG. 10 is a front sectional view according to a vertical plane in correspondence with the front joining device and transmission for an actuation screwdriver and the rear joining device as shown in FIG. 6;

FIG. 11 is a perspective view of a third embodiment of a joining system with front actuation in axis with the thickness of a bottom of furniture and furnishing items produced according to the present invention with a casing for further front and rear joining devices and transmission for an actuation rod of the rear joining device;

FIGS. 12 and 13 are two partial perspective views of the embodiment of the system of FIG. 11, one partially cross-sectional and the other partially front sectional, of a joining system with front actuation;

FIGS. 14 and 15 are cross-sectional views according to a vertical plane in correspondence with the front joining device and transmission for an actuation rod and the rear joining device as shown in FIG. 11;

FIG. 16 is a perspective view of a fourth embodiment of a joining system with front actuation in axis with the thickness of a bottom of furniture and furnishing items produced according to the present invention which differs from that of FIG. 11 in that it uses a screwdriver for actuating the rear joining device;

FIGS. 17 and 18 are two partial perspective views of the embodiment of the system of FIG. 16, one partially cross-sectional and the other partially front sectional;

FIGS. 19 and 20 are cross-sectional views according to a vertical plane in correspondence with the front joining device and transmission for an actuation screwdriver and the rear joining device as shown in FIG. 16;

FIG. 21 is a perspective view of a fifth embodiment of a joining system with front actuation in axis with the thickness of a bottom of furniture and furnishing items produced according to the present invention with front and rear joining devices with a worm screw and transmission for an actuation rod of the rear joining device;

FIGS. 22, 23 and 24 are partial perspective views of the embodiment of the system of FIG. 21, one partially cross-sectional, the other partially exploded and the third front sectional with a different angulation;

FIGS. 25 and 26 are sectional plan views from below of the system of FIG. 21 and cross-sectional according to a vertical plane in correspondence with the rear joining device;

FIG. 27 is a perspective view of a sixth embodiment of a joining system with front actuation in axis with the thickness of a bottom of furniture and furnishing items produced according to the present invention with front and rear joining devices with a worm screw and transmission for an actuation screwdriver of the rear joining device;

FIGS. 28, 29 and 30 are partial perspective views of the embodiment of the system of FIG. 27, one partially cross-sectional, the other partially exploded and the third front sectional with a different angulation;

FIGS. 31 and 32 are sectional plan views from below of the system of FIG. 27 and cross-sectional according to a vertical plane in correspondence with the rear joining device.

With reference in general to the figures, these show some embodiments of a joining system with front actuation in axis with the thickness of a bottom of furniture and furnishing items according to the present invention.

This joining system is destined for being inserted in a piece of furniture M comprising a bottom or base suitable for being positioned between two side shoulders 11 (one of which is partially shown). This joining system is actuated from the front with respect to the furniture M through a space S defined between the bottom 12 and the floor P on which the furniture M rests.

This joining system is therefore suitable for being used in furniture and furnishing items with a bottom 12 and at least a shoulder 11.

In particular, this joining system must provide, in combination, at least one front joining unit UGA and at least one rear joining unit UGP, close to a rear wall (not shown) with more difficult access for the assembly of the furniture M.

The front joining unit UGA and rear joining unit UGP are positioned between the bottom 12 and at least one shoulder 11 of the furniture M. Each front joining unit UGA and rear joining unit UGP is provided with a connection group GC and a blocking group GB, as better described hereunder.

Furthermore, according to the invention, the connection group GC is inserted in each front and rear joining unit UGA, UGP, aligned with a symmetry axis X of the thickness of the bottom 12. More specifically, it can be observed that the shoulder 11 provides a seat S1 in the form of a horizontal blind hole 19, in which 19 a threaded end 20 of a pin 21 is positioned.

The pin 21, in axis with the thickness of the bottom, is housed in a horizontal hole 22 of the bottom 12 itself.

It can also be noted that the hole 22 is aligned with the hole 19 of the shoulder 11 of the furniture M. The pin 21, in its protruding part, provides a housing for a tip of a blocking grub screw 24 of the blocking group GB.

With respect to the front joining unit UGA and also the rear joining unit UGP, these also comprise, in addition to the connection group GC, a body 16, for example prismatic and/or partly rounded, that can be associated in a set-square configuration both under the bottom 12 and with the shoulder 11. The body 16, in fact, contains above at least one snap-in or pressure plug 18 (so-called "duebel") 18, which is housed in a blind hole formed in the bottom 12 downwards.

The bottom 12 and the body 16 provide vertical facing holes 36, 37 which, when aligned with each other, house a cylindrical casing 38, formed for example by means of a pair of half-shells, for an actual joining device.

Alternative holes 39 or 39' are formed in the casing 38, which are aligned with the holes 40, 40', superimposed and formed in the body 16 to be aligned with the previous holes. The hole 39 of the front joining unit UGA is produced in a higher position in the casing 38 and gives access to movement means of the grub screw 24. The grub screw 24 is in fact caused to slide in the casing 38 by means of a pinion-toothed crown bevel 43. A pinion 41 is rotatingly positioned inside the casing 38 and engages with a toothed crown 43, formed as the head of a threaded screw 44. The toothed crown 43 is rotatable inside the casing 38 and the threaded screw 44 is in turn positioned in an axial threaded hole 46 inside the grub screw 24. The rotation of the screw 44 causes the movement of the grub screw 24.

With these means, the blocking is obtained of the pin 21 and therefore the bottom 12 with respect to the shoulder 11 of the furniture M for the front joining unit UGA.

The tip 27 of a tool 26 controls the pinion 41 passing through both the hole 40 of the body 16 and also through the hole 39 of the casing 38.

This arrangement of parts is also provided similarly but not identically in the body 16 of the rear joining unit UGP.

The difference firstly lies in the fact that a transmission rod 29 is provided, housed between the lower hole 40' of the body 16 of the front joining unit UGA and the lower hole 40' of the body 16 of the rear joining unit UGP. The transmission rod 29 inserted, supported and passing into the lower hole 40' in the body 16 of the front joining unit UGA as also into the lower hole 40' in the body 16 and into the lower hole 39' in the casing 38, thus controls the pinion 41 which in turn controls the toothed crown 43 and therefore, as can be seen, the movement of the grub screw 24.

The transmission rod 29 and the hole 40' of the body 16 form actuation and supporting means towards the rear joining unit UGP.

Secondly, the tip 27 of the tool 26 directly controls the transmission rod 29 indicated above, which passes into the lower hole 40' of the front joining unit UGA which is provided as actuation and supporting means.

In this way, the blocking is obtained of the pin 21 and the bottom 12 with respect to the shoulder 11 of the furniture M also for the rear joining unit UGP.

FIGS. 6 to 10 show a second embodiment of a joining system with front actuation in axis with the thickness of a bottom of furniture and furnishing items produced according to the present invention. In this example, in which the same elements are indicated with the same reference numbers as the first example, a transmission rod is not provided, but a long-stemmed screwdriver 31 is used directly for also actuating the rear joining unit UGP.

The description of the various elements is therefore completely identical to the previous example. It should also be pointed out that the body 16 simply provides a lower hole 40' passing into the body 16 and a hole 39' passing into the casing 38 of the front joining unit UGA.

When aligned, these holes 40' and 39' allow the passage of the long-stemmed screwdriver 31 which controls the rear joining unit UGP.

FIGS. 11 to 15 show a third embodiment of a joining system with front actuation in axis with the thickness of a bottom of furniture and furnishing items according to the present invention.

This example is in some respects similar to that described and illustrated with FIGS. 1 to 5 having a transmission rod 29. It should be pointed out, moreover, that the bodies 16 of the front joining unit UGA and the rear joining unit UGP are not provided.

In order to position the transmission rod 29, an actuation and supporting means is therefore provided in the form of a transmission guide 13, which has a hole for housing and allowing the passage of the transmission rod 29. Said transmission guide 13 is formed as a separate body, but forming part of the front joining unit UGA.

The positioning of this transmission guide 13 is achieved by the fact that it provides a snap-in or pressure plug 18 which is housed in a blind hole 17 vertically formed in the bottom 12 downwards.

Furthermore, the casings 38 in this case can be produced with the same length unlike the previous case indicated above in which one was shorter and another longer. A flange 47 is incorporated for their positioning, provided with a snap-in or pressure plug 18 which is housed in a blind hole 17 vertically formed in the bottom 12 downwards.

The tool 26 therefore directly actuates the pinion of the front joining unit UGA and, through the transmission rod 29, housed on one side in the transmission guide 13 and on the other in the rear joining unit UGP, thus controls the rear joining unit UGP.

FIGS. 16 to 20 show a fourth embodiment of a joining system with front actuation in axis with the thickness of a bottom of furniture and furnishing items produced according to the present invention.

This further example differs from the previous example illustrated in FIGS. 11 to 15 in the fact that it uses a long-stemmed screwdriver 31 for actuating the rear joining device of the rear joining unit UGP.

In order to use the screwdriver 31, it is simply necessary to have an actuation and supporting means in the form of a transmission guide 13, which has a pass-through hole 14 for allowing the passage of the long stem of the screwdriver 31. Said transmission guide 13 is formed as a separate body, but forming part of the front joining unit UGA.

FIGS. 21 to 26 show a fifth embodiment of a joining system with front actuation in axis with the thickness of a bottom of furniture and furnishing items produced according to the present invention. The same reference numbers are used for the same elements.

In this example, devices with a worm screw and toothed wheel are used as actual front and rear joining devices, and a transmission for an actuation rod of the rear joining device is present.

The front joining unit UGA and the rear joining unit UGP are always present in the example, positioned between the bottom 12 and the at least one shoulder 11 of the furniture M. A connection group GC and a blocking group GB are also provided for each front joining unit UGA and rear joining unit UGP. Again, according to the invention, the connection group GC is inserted in each front joining unit UGA and rear joining unit UGP in axis with the thickness of the bottom 12 and provides the parts already described.

A body 16, associated under the bottom 12, is provided in these front UGA and rear UGP joining units, in addition to the connection group GC. The body 16 has a seat 48 for a worm screw 49 configured for collaborating with a toothed wheel 50 in turn housed in a seat 51.

The toothed wheel 50 integrally carries a screw 224 which is screwed into an internal threading 33 formed in a sleeve extension 52 positioned above the body 16. The screw 224 is thus compelled to slide in the seat 51 when rotated.

The body 16 carries above at least one pair of snap-in or pressure plugs 18 (so-called "duebels") 18, which are housed in blind holes 17 formed in the bottom 12 of the furniture M downwards.

The screw 224 is thus positioned in the housing 23 of the pin 21 firmly blocking the parts.

A transmission guide 213 is positioned constrained to the body 16 for example, which has a hole 214 for housing and allowing the passage of the transmission rod 29. Said transmission guide 213 is formed as a separate body, but forming part of the front joining unit UGA, as it can also be in one piece with the body 16.

The positioning of this transmission guide 213 is achieved in this example by the fact that it provides a snap-in or pressure plug 18 which is housed in a hole 217 of the body 16.

FIGS. 27 to 32 show a sixth embodiment of a joining system with front actuation in axis with the thickness of a bottom of furniture and furnishing items produced according to the present invention.

In this example, the same reference numbers are used, when possible, as those already used, in particular for the previous example. The actual rear joining device with a worm screw and toothed wheel is in fact actuated by a screwdriver through a transmission guide.

A brief description is illustrated by the figures whereby, once the pin 21 has been positioned in its seat S1 and associated with the bottom 12 with the insertion of the pin 21 in its hole 22, it is possible to act on the front joining unit UGA and rear joining unit UGP.

In order to achieve the blocking between the parts (shoulder and bottom), the worm screw 49 is actuated with the tool 26 for the front joining unit UGA. The rotation of the worm screw 49 also causes the rotation of the toothed crown 50 which rotates the screw 224 which, engaged in the threading 33, moves forwards. In this way, its tip is housed in the housing 23 of the pin 21 firmly blocking it.

For the rear joining unit UGP, on the other hand, the long stem of the screwdriver 31 is inserted in the hole 214 of the transmission guide 213. The tip of the screwdriver 31 is then engaged with the seat present in the head of the worm screw 49 and also in this case, as previously, the blocking between the parts is actuated.

It can be seen how, with a joining system with front actuation in axis with the thickness of a bottom of furniture and furnishing items according to the invention, a solution is provided to all the problems envisaged in the known art indicated above.

Primarily, all visible holes have been eliminated from the furniture and an adjustable joint has been provided which can be actuated in the minimum space existing between the bottom or base and floor from a front position.

The elements of the system have been minimized and are extremely simple to construct and use. The holings in the shoulders and in the bottom or base have also been minimized.

The advantages and innovative characteristics of the joining system with front actuation in axis with the thickness of a bottom of furniture and furnishing items according to the present invention are therefore evident.

The forms and structure for producing a joining system with front actuation in axis with a bottom according to the present invention, as also the materials and assembly modes, can naturally differ from those shown for purely illustrative and non-limiting purposes in the drawings.

The objectives mentioned in the preamble of the description have therefore been achieved.

The protection scope of the present invention is defined by the enclosed claims.

The invention claimed is:

1. A joining system adapted for use in furniture and furnishing items with a bottom (12) and a shoulder (11) and having a front actuation axis under said bottom (12) of a piece of furniture or furniture item, comprising:
   at least one front joining unit (UGA); and
   at least one rear joining unit (UGP) positioned between said bottom (12) and said shoulder (11),
   wherein a connection group (GC) is inserted in each front and rear joining unit (UGA, UGP) and is aligned with a symmetry axis (X) of said bottom (12),
   wherein a blocking group (GB) of each front and rear joining unit (UGA, UGP) is arranged attached beneath a thickness of said bottom (12), said at least one front joining unit (UGA) providing an actuation and supporting member (40'; 13, 14; 213, 214) towards said at least one rear joining unit (UGP), and
   wherein said blocking group (GB) provides a grub screw (24) inserted in a casing (38) and caused to slide by a conical pinion-rack system to be received in a housing of a pin (21) forming part of said connection group (GC).

2. The joining system according to claim 1, wherein at least one hole (39 or 39') for a control tool (26, 27) of said conical pinion is formed in said casing (38).

3. The joining system according to claim 1, wherein the grub screw has a longitudinal threaded hole defined therein, wherein said a conical pinion-rack system comprises the conical pinion (41), which is rotatingly positioned inside said casing (38), and a toothed crown (43) engaged to the conical pinion, the toothed crown operating as the rack of the conical pinion-rack system and being formed as a head of a threaded screw (44) positioned in the longitudinal threaded hole (46) inside said grub screw (24).

4. The joining system according to claim 1, wherein said casing (38) is positioned in a body (16) affixed under said bottom (12).

5. The joining system according to claim 1, wherein said casing (38) incorporates a flange (47) provided with at least one snap-in or pressure plug (18), which is housed in a blind hole (17) formed in the bottom (12).

6. The joining system according to claim 1, said actuation and supporting member is produced as a separate body (13, 14; 213, 214) from said at least one front joining unit (UGA).

7. The joining system according to claim 6, wherein said actuation and supporting member comprises a transmission guide (13, 213) provided with a pass-through hole (14, 214) towards said at least one rear joining unit (UGP).

8. The joining system according to claim 7, wherein said pass-through hole (14, 214) of said actuation and supporting member (13, 213) is configured to receive a transmission rod (29) or a long-stemmed screwdriver (31).

9. A joining system adapted for use in a piece of furniture or a furnishing item with a bottom (12) and a shoulder (11) and having a front actuation axis under said bottom (12) of said piece of furniture or said furnishing item, comprising:
   at least one front joining unit (UGA);
   at least one rear joining unit (UGP) positioned between said bottom (12) and said shoulder (11);
   a connection group (GC) inserted in each front and rear joining unit (UGA, UGP) aligned with a symmetry axis (X) of said bottom (12); and
   a blocking group (GB) of each front and rear joining unit (UGA, UGP) arranged attached beneath a thickness of said bottom (12) of the furniture, said at least one front joining unit (UGA) providing an actuation and supporting member (40'; 13, 14; 213, 214) towards said at least one rear joining unit (UGP),
   wherein said blocking group (GB) provides a worm screw-toothed wheel pair (49, 50) positioned in a body (16), associated under the bottom (12), which causes a second screw (224) to slide, said second screw being engaged in a housing (23) of a pin (21) forming part of said connection group (GC).

10. The joining system according to claim 9, wherein said body (16) has a seat (48) for said worm screw (49) arranged for collaborating with said toothed wheel (50), said toothed wheel being housed in a second seat (51), wherein said toothed wheel (50) integrally carries said second screw (224), which is screwed into an internal threading (33) formed in a sleeve extension (52) positioned above said body (16).

11. The joining system according to claim 9, wherein said connection group (GC) of said at least one front joining unit (UGA) and at least one rear joining unit (UGP) comprises a pin (21) on one side housed in a seat (S1) of the shoulder (11) and on the other side housed in a hole (22) in said bottom (12).

12. The joining system according to claim 1, wherein said at least one front joining unit (UGA) and at least one rear joining unit (UGP) each have a body provided with at least one snap-in or pressure plug (18), which is housed in at least one blind hole (17) formed in the bottom (12).

* * * * *